US011256603B2

(12) United States Patent
Allyn et al.

(10) Patent No.: US 11,256,603 B2
(45) Date of Patent: Feb. 22, 2022

(54) GENERATING AND ATTRIBUTING UNIQUE IDENTIFIERS REPRESENTING PERFORMANCE ISSUES WITHIN A CALL STACK

(71) Applicant: MICROSOFT TECHNOLOGY LICENSING, LLC, Redmond, WA (US)

(72) Inventors: Barry Christopher Allyn, Snohomish, WA (US); Mert Ussakli, Seattle, WA (US); Benjamin Triet-Minh Nguyen, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 16/601,287

(22) Filed: Oct. 14, 2019

(65) Prior Publication Data
US 2021/0109844 A1 Apr. 15, 2021

(51) Int. Cl.
*G06F 11/36* (2006.01)

(52) U.S. Cl.
CPC ........ *G06F 11/3636* (2013.01); *G06F 11/366* (2013.01); *G06F 11/3612* (2013.01)

(58) Field of Classification Search
None
See application file for complete search history.

(56) References Cited

U.S. PATENT DOCUMENTS

| | | | | |
|---|---|---|---|---|
| 7,840,946 | B2 * | 11/2010 | Gupta | G06F 11/36 717/124 |
| 8,578,213 | B2 * | 11/2013 | Han | G06F 11/3636 714/38.1 |
| 9,830,478 | B1 * | 11/2017 | Hale | G06F 8/70 |
| 2006/0253837 | A1 | 11/2006 | Hudson et al. | |
| 2008/0010526 | A1 * | 1/2008 | Modani | G06F 11/36 714/30 |

(Continued)

OTHER PUBLICATIONS

F. Doray and M. Dagenais, "Diagnosing Performance Variations by Comparing Multi-Level Execution Traces," in IEEE Transactions on Parallel and Distributed Systems, vol. 28, No. 2, pp. 462-474, Feb. 1, 2017, doi: 10.1109/TPDS.2016.2567390. (Year: 2017).*

(Continued)

*Primary Examiner* — Andrew M. Lyons
(74) *Attorney, Agent, or Firm* — NovoTechIP International PLLC

(57) ABSTRACT

Various embodiments discussed herein enable unique identifiers or hash values to be generated that uniquely identify performance issues and associated call stack units, which may be attributed to a user or team of users. A performance issue for a currently running process can be detected. A particular location within a call stack of the process indicating where the performance issue was detected can be determined. A quantity of call stack frames within the particular location that account for a threshold proportion of the performance issue can be determined. A hash value that uniquely identifies the performance issued can be generated based at least in part on the particular location and the quantity of call stack frames within the particular location that account for the threshold proportion of the performance issue.

19 Claims, 26 Drawing Sheets

(56) References Cited

U.S. PATENT DOCUMENTS

| | | | |
|---|---|---|---|
| 2013/0081000 A1* | 3/2013 | Robinson | G06F 11/3692 |
| | | | 717/127 |
| 2014/0096114 A1* | 4/2014 | Koren | G06F 11/3466 |
| | | | 717/128 |
| 2016/0085656 A1* | 3/2016 | Braun | G06F 11/0748 |
| | | | 714/38.11 |
| 2018/0307582 A1* | 10/2018 | Vikjord | G06N 20/00 |
| 2018/0357147 A1* | 12/2018 | Imon | G06F 11/3476 |
| 2019/0138348 A1* | 5/2019 | Holder | G06F 9/52 |
| 2019/0370141 A1* | 12/2019 | Choi | G06F 11/3075 |
| 2020/0104110 A1* | 4/2020 | Singh | G06F 11/079 |

OTHER PUBLICATIONS

N. Modani, R. Gupta, G. Lohman, T. Syeda-Mahmood and L. Mignet, "Automatically Identifying Known Software Problems," 2007 IEEE 23rd International Conference on Data Engineering Workshop, 2007, pp. 433-441, doi: 10.1109/ICDEW.2007.4401026. (Year: 2007).*

"International Search Report and Written Opinion Issued in PCT Application No. PCT/US20/051358", dated Dec. 4, 2020, 14 Pages.

* cited by examiner

| Insights | | | | | |
|---|---|---|---|---|---|
| Time | Activity | Description | Bug | Count | More Info |
| 11:27:35am 3-14-2019 | | ▷ Module reloaded due to intermediate FreeLibrary() call | | 7 | |
| 12:42:42am 3-14-2019 | | Soft hang detected (656 ms) in CbvCreateObjects -> Mso::UIColor::Details::W... | create | 1 | |
| 2:05:14pm 3-14-2019 | | Soft hang detected (1182.39 s) in CIOPort::ProcessItems -> GetQueuedCompl... | create | 1 | |
| 2:24:55pm 3-14-2019 | Office.FileIO.M... | Soft hang detected (4.34 s) in CTaskManager::RunModalTaskWorkerTag -> 'D... | 15677 (New) | 1 | |
| 2:25:02pm 3-14-2019 | | ▷ Registry access is excessive | | 10 | |
| 2:25:03pm 3-14-2019 | PowerPoint File... | Wait time did not meet expectation (expected: <5000ms, actual: 6248ms) | create | 1 | |
| 3:04:43pm 3-14-2019 | | Soft hang detected (2.98 s) in KiUserCallbackDispatcherContinue -> fnINOU... | create | 2 | |
| 10:42:25am 3-15-2019 | | Soft hang detected (766 ms) in Mso::HwndEffects::HwndListener::StaticMainLi... | cre... | 1 | Ctrl+Click to create a new bug for this issue |
| 10:42:26am 3-15-2019 | | Soft hang detected (1.27 s) in HandleSystemEventMessage -> TBS::LRSysRe... | cre... | 1 | Press F5 to refresh |
| 11:11:11am 3-15-2019 | | Sleep(105) call detected on main thread | cre... | 1 | |
| 11:11:11am 3-15-2019 | | Sleep(110) call detected on main thread | create | 2 | |
| 11:11:11am 3-15-2019 | | Sleep(120) call detected on main thread | create | 1 | |

Create Bug  [X]

NOTE: When creating a bug, you are creating work for someone else to triage and investigate the issue. Therefore, to minimize impact on others please consider the following before proceeding:

- Only log bugs that you feel are truly impacting the user experience.
- Do NOT log a bug simply because HUD identified a potential issue.
- Verify that this bug is not a dupe of another issue already logged (i.e. as reported in the Insights window).
- Once the bug has been logged, please update the title and description to describe the repro steps and other actionable information.

Would you like to create a bug for this insight?

[Yes] — 1213      [No]

*FIG. 12B.*

| Insights | | | | | |
|---|---|---|---|---|---|
| Time | Activity | Description | Bug | Count | More Info |
| 11:27:35am 3-14-2019 | | ▷ Module reloaded due to intermediate FreeLibrary() call | | 7 | |
| 12:42:42am 3-14-2019 | | Soft hang detected (656 ms) in CbvCreateObjects -> Mso::UIColor::Details::W... | create | 1 | |
| 2:05:14pm 3-14-2019 | | Soft hang detected (1182.39 s) in CIOPort::ProcessItems -> GetQueuedCompl... | create | 1 | |
| 2:24:55pm 3-14-2019 | Office.FileIO.M... | Soft hang detected (4.34 s) in CTaskManager::RunModalTaskWorkerTag -> 'D... | 15677 (New) | 10 | |
| 2:25:02pm 3-14-2019 | | ▷ Registry access is excessive | create | 1 | |
| 2:25:03pm 3-14-2019 | PowerPoint File... | Wait time did not meet expectation (expected: <5000ms, actual: 6248ms) | 14789 (New) | 2 | |
| 3:04:43pm 3-14-2019 | | Soft hang detected (2.98 s) in KiUserCallbackDispatcherContinue -> fnINOU... | cre... | 1 | Ctrl+Click to create a new bug for this issue Press F5 to refresh |
| 10:42:25am 3-15-2019 | | Soft hang detected (766 ms) in Mso::HwndEffects::HwndListener::StaticMainLi... | cre... | 1 | |
| 10:42:26am 3-15-2019 | | Soft hang detected (1.27 s) in HandleSystemEventMessage -> TBS::LRSysRe... | cre... | 1 | |
| 11:11:11am 3-15-2019 | | Sleep(105) call detected on main thread | create | 1 | |
| 11:11:11am 3-15-2019 | | Sleep(110) call detected on main thread | create | 2 | |
| 11:11:11am 3-15-2019 | | Sleep(120) call detected on main thread | create | 1 | |

FIG. 12D.

```
uint32_t CalculateHangCrc(const CallstackRef& callstack, CallstackEmphasis
emphasis, std::wstring& crcBasis, std::vector<std::wstring>*
pCrcBasisSymbols)
{
        crcBasis.clear();
        const auto& rawCallstack = *callstack.GetRawCallstack();
        const auto pResolvedCallstack = callstack.GetResolvedCallstack();
        if ((pResolvedCallstack == nullptr) || (pResolvedCallstack-
>GetFrameCount() == 0))
                return 0;    // empty callstack // hang stack hot path checksums used for generating hashes in bug
reports should only be based on blame frames.
        //          BIG BIG NOTE: if you change the following algorithm
then hashes used to uniquely identify bugs will be different and
previously logged bugs for
        //          all hang stacks will no longer be found, in turn
causing a fresh set of bugs that will need to manually be
investigated. Be careful
        //          changing this setting -- you will create work for
someone!
        uint32_t crc = 0;
        constexpr std::array<float, 5> edgeThresholds = {0.5f, 0.4f, 0.3f,
0.2f, 0.1f};
        for (const auto edgeThreshold : edgeThresholds)
        {
                BlameFrames blameFrames;
                CalculateBlameFrames(rawCallstack, emphasis, edgeThreshold,
blameFrames);
                if (blameFrames.empty())
                        continue;    // edgeThreshold is too coarse, try
something finer // if the leaf frame took all the blame, keep
searching. Otherwise too many hangs will be coalesced together
                // under (e.g.) a WaitForSingleObject call and therefore
lose their unique signature and not point to feature code.
                if ((blameFrames.size() == 1) && (*blameFrames.begin() ==
rawCallstack.GetFrameCount() - 1))
                        continue;

crc = pResolvedCallstack->CalcStableCrc(&blameFrames,
&crcBasis, pCrcBasisSymbols);
                if (crc != 0)
                        return crc;    // found one, we're done
        }

// use the entire stack if couldn't find coarse blame frames
        crc = pResolvedCallstack->CalcStableCrc(nullptr /*pBlameFrames*/,
&crcBasis, pCrcBasisSymbols);
        if (crc == 0)
                throw; // should've been able to calculate a CRC return crc;
}
```

*FIG. 13A.*

```
//==============================================================
// CalculateBlameFrames
//
// calculate a list of key frames in a stack where there is a change in percentage of a given frame
cost ('emphasis') between a
// parent and child frame.   Will return the blame frames as raw frame indices in 'result'.
//==============================================================
void CalculateBlameFrames(const IRawCallstack& callstack, CallstackEmphasis emphasis, float
changePct, BlameFrames& result)
{
        result.clear();

if (callstack.GetFrameCount() == 0)
                return;       // nothing we can do CalculateBlameFramesParams params{};
        params.pCallstack = &callstack;
        params.emphasis = emphasis;
        params.pctEdgeDropThreshold = changePct;
        params.pBlameFrames = &result;

static_assert(static_cast<uint32_t>(CallstackEmphasis::Count) == 6, "new CallstackEmphasis enum
detected, please update this function.");
        switch (emphasis)
        {
                case CallstackEmphasis::CpuTime:
                {
                        params.pct100 = static_cast<float>(callstack.GetCpuTime());
                        break;
                }
                case CallstackEmphasis::WaitTime:
                {
                        params.pct100 = static_cast<float>(callstack.GetWaitTime());
                        break;
                }
                case CallstackEmphasis::TotalTime:
                {
                        params.pct100 = static_cast<float>(callstack.GetTotalTime());
                        break;
                }
                case CallstackEmphasis::Samples:
                {
                        params.pct100 = static_cast<float>(callstack.GetSampleCount());
                        break;
                }
                case CallstackEmphasis::Auto:
                case CallstackEmphasis::AllFrames:
                default:
                        throw;
        }

// if there is no time for this callstack then we can't find blame
        if (params.pct100 == 0.0f)
                return;

// let the recursive helper do all the work.
        CalculateBlameFramesHelper(params);
}
```

*FIG. 13A Cont.*

GENERATING AND ATTRIBUTING UNIQUE IDENTIFIERS REPRESENTING PERFORMANCE ISSUES WITHIN A CALL STACK

INTRODUCTION

Software performance engineering (SPE) is the set of tasks or activities performed across the software development life cycle (SLDC) to ensure that requirements for performance (e.g., memory utilization, latency, throughput) are met for an application. For example, SPE may include defining the requirements (e.g., performance policies and scalability requirements), defining and building the architecture design to meet performance policies (e.g., generating boot activities that do not hang over a threshold), testing performance to validate the performance policies, and utilizing performance monitoring to continuously assess application performance. Accordingly, SPE helps software applications meet specific requirements and limits bugs or other performance issues before the software applications become fully deployable.

Typically, tools such as profilers, are used for testing performance of an application. This may include users manually setting and stopping traces and scrolling though call stacks to manually determine if performance is violating performance policies. In many instances, during the SDLC, the architecture design of an application is subject to code churning or other code modification. For example, developers may re-name functions or classes, algorithms may change, lines of code may be added or deleted, recursion may occur, and the like. This can cause problems not only with performance testing tools, but computer resources (e.g., memory storage, CPU utilization, etc.) upon application deployment. This issue is further compounded by the fact that teams of developers in a lot of instances are responsible for developing different applications or instances of a single application (e.g., modules). Accordingly, pathing a performance issue back to a single developer or team can be problematic.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein enable unique identifiers or hash values to be generated that uniquely identify performance issues and associated call stack units (e.g., stack frames), which may be attributed to a user or team of users. In one example operation, a Cyclic Redundancy Check (CRC) hash can be generated for a set of call stacks that are associated with a threshold hang time of a hang performance issue. In this way, for example, multiple stack units are determined to correspond to the same performance issue, as opposed to typical tools that may log each stack unit associated with a performance issue as a separate performance issue instance. This can be especially problematic where there is code churning or other code modification (e.g., function renaming).

In some embodiments, these unique identifiers can be compared with other unique identifier stored in a bug data store to determine whether the performance issue has already been logged as a bug and if not, the unique identifier can be attributed to another identifier representative of a developer, user, or team that created or is otherwise responsible for the code that caused the performance issue. In this way, bug logging of performance issues can be crowdsourced and a notification of the bug can be transmitted to such developer, user, or team.

Existing technologies, such as profilers, have various shortcomings. For example, existing tools: require users to scroll through call stacks and manually identify a performance issue and perform many more manual operations, identify performance issues separately when they should be a part of the same performance issue, and require users to drill down several layers of a user interface to find relevant information. Various embodiments of the present disclosure improve these existing technologies by generating a hardened unique identifier or hash for call stack units so that performance issues are not wrongly identified as the same performance issue and so that performance issues are immune to code churning and other code modification. Some embodiments of the present disclosure also improve these technologies by rendering an intelligent user interface that does not require users to drill down several layers to navigate to relevant information. Some embodiments also improve these technologies by automating functionality via particular rules and improve computing resource consumption, such as memory, CPU, and the like.

BRIEF DESCRIPTION OF THE DRAWINGS

The present invention is described in detail below with reference to the attached drawing figures, wherein:

FIG. 6 is a screenshot of a user interface illustrating a history of Dynamic-Link Libraries (DLL) activity and attributes them to a corresponding call stack, in accordance with some embodiments.

FIG. 11 is a screenshot of a policy file that is used to detect performance issues, in accordance some embodiments;

FIG. 12A is a screenshot of a user interface indicating performance issues detected and bug generation functionality, in accordance with some embodiments;

FIG. 12B is a screenshot indicating bug creation functionality, in accordance with some embodiments;

FIG. 12D is a screenshot of a user interface indicating that a bug associated with the performance issue of a record of FIG. 12A has now been generated, in accordance with some embodiments;

FIG. 13A is a schematic diagram of a coding algorithm that generates a CRC hash for a set of stack frames, in accordance with some embodiments;

DETAILED DESCRIPTION

Figure 1:
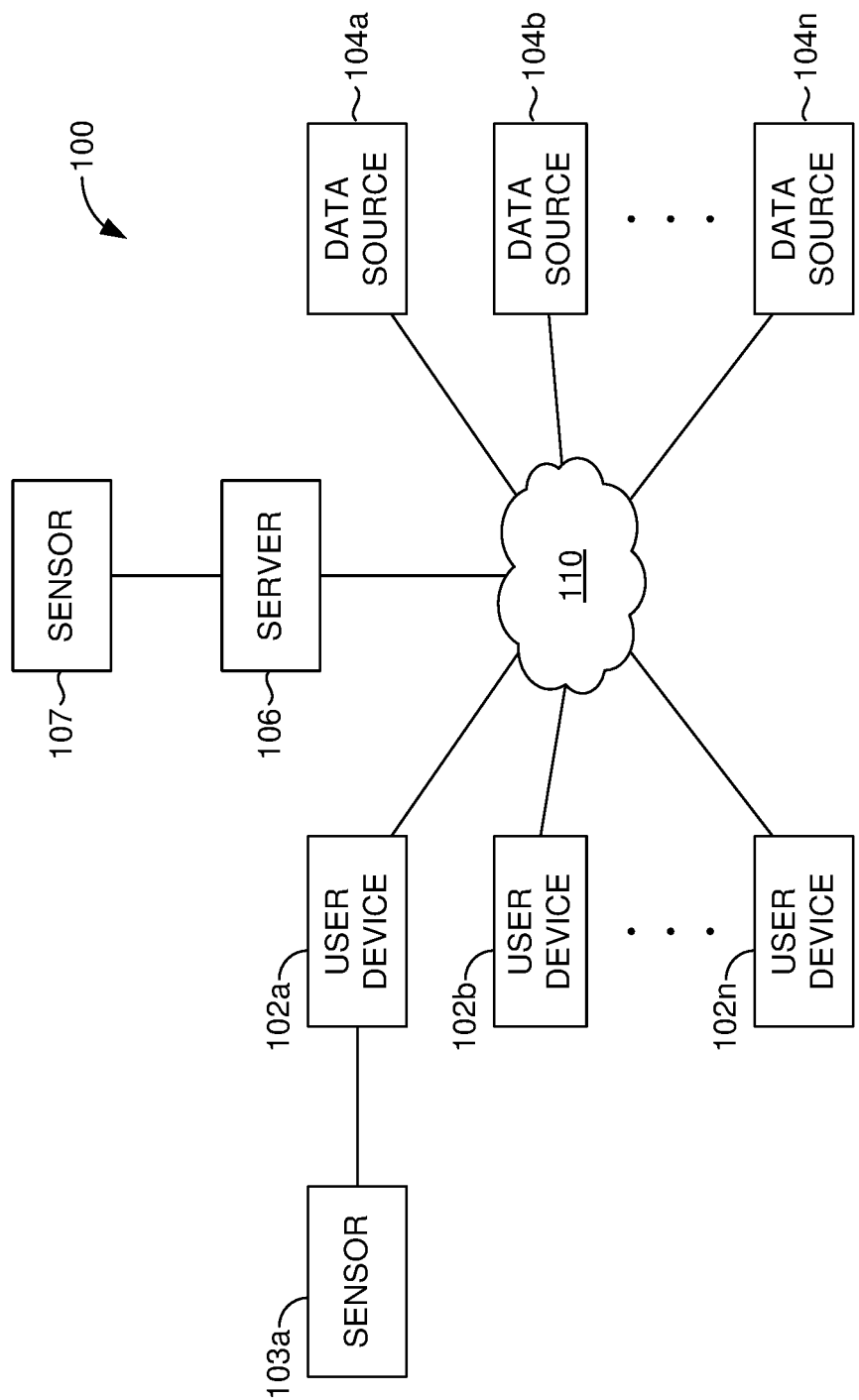
FIG. 1 is a block diagram of an example system, in accordance with some embodiments.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As used herein, the term "set" may be employed to refer to an ordered (i.e., sequential) or an unordered (i.e., non-sequential) collection of objects (or elements), such as but not limited to data elements (e.g., events, clusters of events, and the like). A set may include N elements, where N is any non-negative integer. That is, a set may include 0, 1, 2, 3 . . . N objects and/or elements, where N is a positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

Various embodiments described herein enable unique identifiers or hash values to be generated that uniquely identify performance issues and/or call stack units, which may be attributed to a user or team of users. A "performance issue" as described herein refers to a performance metric value (e.g., network utilization percentage, CPU utilization percentage, quantity of hangs, etc.) that has exceeded a threshold or violated one or more policies (e.g., the network utilization is above a percentage threshold) for one or more processes. Performance is thus indicative of a certain computing resource (e.g., CPU, memory, threads) utilization value output that can fall inside or outside of a threshold (becoming an issue or not an issue). In some aspects, a "process" includes one or more instructions, routines, or instances of an application that are currently being processed by one or more computer processors.

In some embodiments, before unique identifiers can be generated and attributed to one or more users, performance issues are first detected and then call stacks are queried to determine the specific call stack location of where the performance issue was detected. For example, the system can detect that a hang has exceeded a threshold or cost (e.g., 1 second) for a MICROSOFT POWERPOINT process in response to a user copying and pasting characters in the application. A "hang" as described herein refers to the situation where a message or request sits beside a message passing component (e.g., a message pump, event loop, or message dispatcher) greater than a threshold quantity of time. These components typically move messages or requests from a message queue into an application for processing. This message removal from queue data structures can be delayed when there are problems, such as an infinite loops or recursion, a slow network, threads waiting for events that will never occur, or throttling to name a few. Colloquially, hangs correspond to a "freeze" event where a request stalls and the system consequently no longer takes input. For example, a hang can occur when a user selects a GUI feature such that the GUI no longer takes input because it is still processing the GUI feature selection.

When a performance issue is detected, a call stack can be queried to see exactly what may be causing the performance issue. A "call stack" refers to a stack data structure (a LIFO) that stores information about active subroutines or instances (e.g., methods, functions, or procedures) of an application. In some embodiments, an "active" instance, such as an active function, is one that has not yet returned any values (e.g., to the function that called it), or has yet to complete execution (e.g., such as a Python "print" function that has not yet displayed data). Accordingly, for example, active instances may be those that have called other instances but have not received corresponds values back from those other instances or those in which the instance is actively performing an algorithm. Call stacks help users keep track of the point or location at which active instances should return control when it finishes executing.

Each call stack contains entries or stack units. A "stack unit" (e.g., a stack frame or activation record) as described herein is a collection of data on the call stack associated with a single subroutine or instance call, such as a function call and its argument data. In some embodiments, the stack unit includes the return address (location directly after where a subroutine is called), argument variables or parameters passed on the stack (e.g., 100 where variable X=100, and 100 is passed into method from caller), local variables (exists within the current method), code line number, and/or saved copies of any registered modified by the subroutine that needs to be restored. In various instances, each time a function is called, a new stack unit is generated or pushed onto the stack, and each time a function returns, the frame for that function is eliminated or popped of the stack. If a function is recursive, there can be many stack instances for the same function.

Various embodiments of the present disclosure dynamically and selectively identify specific boundaries (e.g., stack units) associated with performance issues within a call stack and keep the boundaries hardened such that it is not subject to code churning or other code modifications. Accordingly, performance issues or bugs can consistently be logged, and redundant or duplicative bug logging can be eliminated. In some embodiments, all of the activity within a call stack that has occurred over the duration of a hang (or other performance issue), including several stack units, are reduced to a single identifier or hash. In this way, multiple stack units are reported as the same performance issue, as opposed to typical tools that may log each stack unit associated with a performance issue as a separate performance issue instance. This can be especially problematic where there is code modification, such as function renaming. In this situation, typical tools may wrongly associate the new function with a new bug if a performance issue was detected within the associated call stack. In various embodiments of the present disclosure, however, because the range of call stack units are already identified and have a hardened hash that does not change, there would be no duplicative logging.

In an illustrative example, a policy may be defined to provide a performance issue indication where hangs are greater than a threshold X. If a hang occurred over the threshold X various parent and child stack frame units can be queried to see if they are responsible for a percentage cost threshold X of the total hang and depending on the exact location of the call stack frame unit associated with the performance issue, a specific quantity of call stack units can be consolidated and represented as a hash, which is described in more detail below.

Having this unique identifier or hash also allows developers, end users, or teams to crowdsource bug generation in an efficient manner so that performance issues can easily be spotted, fixed, and routed to the appropriate team or user. For example, it can be determined whether a hash value representing several call stack units associated with a performance issue matches any other hash value stored in memory. In various cases, a matching of the hash values is indicative of the performance issue having been previously logged or analyzed by a user. Based on the hash value not matching any other hash value, an indication can be caused to be displayed to a user interface corresponding to the performance issue not having been logged as a bug before by other developers or users. Accordingly, a new bug can be generated by a user, which can then be routed to the correct user or team of users responsible for the code corresponding to the boundaries of the hash value or unique identifier where the performance issue was spotted. In this way, performance issues and bugs can be crowdsourced in an easy and efficient manner.

Existing technologies, such as profilers, have various shortcomings. For example, existing tools, such as WINDOWS PERFORMANCE ANALYZER (WPA) or other profilers require users to manually set and stop traces, manually load the profiler after a process has started, require users to scroll through call stacks and manually identify a performance issue, and require users to drill down several layers of a user interface to find relevant information. Accordingly, using profiler tools and the associated user interfaces are tedious and not intuitive to use for users.

Various embodiments of the present disclosure improve these existing technologies via new functionalities that these existing technologies or computing devices do not now employ. For example, some embodiments of the present disclosure improve these technologies by generating a hardened unique identifier or hash, as described above, so that performance issues are immune to code churning and other code modification. Some embodiments of the present disclosure also improve these technologies by rendering an intelligent user interface that does not require users to drill down several layers to get to relevant information. For example, some embodiments provide a full view user interface where the call stack, performance data, and performance issues are immediately viewable on a single page or view (e.g., FIG. 5). This is a highly intuitive interface that does not require the user to navigate through several windows or views like existing technologies, thereby speeding up navigation for the user. Moreover, in some embodiments, the full view includes highly intuitive tabs that represent performance data categories. These tabs allow a user to quickly and conveniently switch back and forth between each performance data resource to rapidly spot information of interest. For example, some embodiments have a "modules" tab, "threads" tab, "registry" tab, and "file I/O" tab, which allows the user to quickly locate associated information.

Some embodiments of the present disclosure also improve existing software technologies by automating tasks (e.g., performance issue monitoring, identifying the performance issues in call stacks (via a hash), etc.) via certain rules (e.g., naming specific processes in hydra-mode before process is launched). As described above, such tasks are not automated in various existing technologies and have only been historically performed by humans or manual input of users. In particular embodiments, incorporating these certain rules improve existing technological processes by allowing the automation of these certain tasks. For example, a rule may indicate to consolidate several call stack frames associated with the greatest hang time and identify it with a single unique identifier or hash. Based on this rule, once a hang performance issue is detected, this rule is used to find the call stack frames and hash and automatically highlight the corresponding frames in a GUI (e.g., via heat map functionality), which automatically identifies the performance issue, as opposed to requiring a user to manually looking through an entire call stack without any reference to where the hang issue is at.

Existing technologies also consume an unnecessary amount of computing resources, such as memory and CPU. For example, where there are performance issues detected for a set of call stack frames, because certain technologies treat each call stack frame as an individual instance associated with a performance issue, some technologies require memory managers to allocate memory for each instance indicating different performance issues even though they belong to the same function or set of call stack frames. However, various embodiments reduce the amount of memory allocation because in some cases only the boundaries or unique identifiers or hash that represents several call stack frames are stored, as opposed to each call stack frame. In another example, the manual human intervention and drilling down of several layers required by existing technologies are more likely to cause performance issues to be missed and passed at the deployment stage because there are more likely to be bugs or other errors with the application. This may cause unnecessary threads to be run, hangs to occur, and the like, which not only degrades the deployed application, but the underlying computer that runs the application, thus consuming an unnecessary amount of computing resources, such as increased CPU utilization. Various embodiments of the present disclosure improve this by generating automatic insights or automatically detecting performance issues and providing the rich data in a single user interface view. In this way, performance can be more closely monitored and fixed such that there is a reduction of system resource utilization, such as CPU utilization, memory, network latency, and the like.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources (e.g., databases or other data stores), such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 800 as described in connection to FIG. 8, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. In some embodiments, the one or more servers 106 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the network 110.

In some embodiments, a user device 102a and/or server 106 may include performance issue tools or logic to detect performance issues and any other functionality described herein. For example, the user device 102 may have a process or application installed, as well as a performance tool. In some embodiments, in response to the process or application activating or launching, the performance tool may automatically generate performance metrics. In some embodiments, the performance issues are then detected such that a user device 102a logs the performance issue as a bug, which is then automatically routed to the server 106 and/or another user device 102(b) via the network 110 so that users can crowdsource bug generation, as described herein.

In some embodiments, a user device 102a or server 106, alternatively or additionally, comprise one or more web servers and/or application servers to facilitate delivering web or online content to browsers installed on a user device 102b. Often the content may include static content and dynamic content. When a client application, such as a web browser, requests a website or web application via a URL or search term, the browser typically contacts a web server to request static content or the basic components of a website or web application (e.g., HTML pages, image files, video files, and the like.). Application servers typically deliver any dynamic portions of web applications or business logic portions of web applications. Business logic can be described as functionality that manages communication between a user device and a data store (e.g., a database). Such functionality can include business rules or workflows (e.g., code that indicates conditional if/then statements, while statements, and the like to denote an order of processes).

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100 or system 200 described in connection to FIG. 2. Examples of data source(s) 104a through 104n may be one or more of a database, a file, data structure, or other data store. Data sources 104a and 104b through 104n may be discrete from user devices 102a and 102b through 102n and server 106 or may be incorporated and/or integrated into at least one of those components. In one embodiment, data sources 104a through 104n comprise sensors (such as sensors 103a and 107), which may be integrated into or associated with the user device(s) 102a, 102b, or 102n or server 106.

Figure 2:
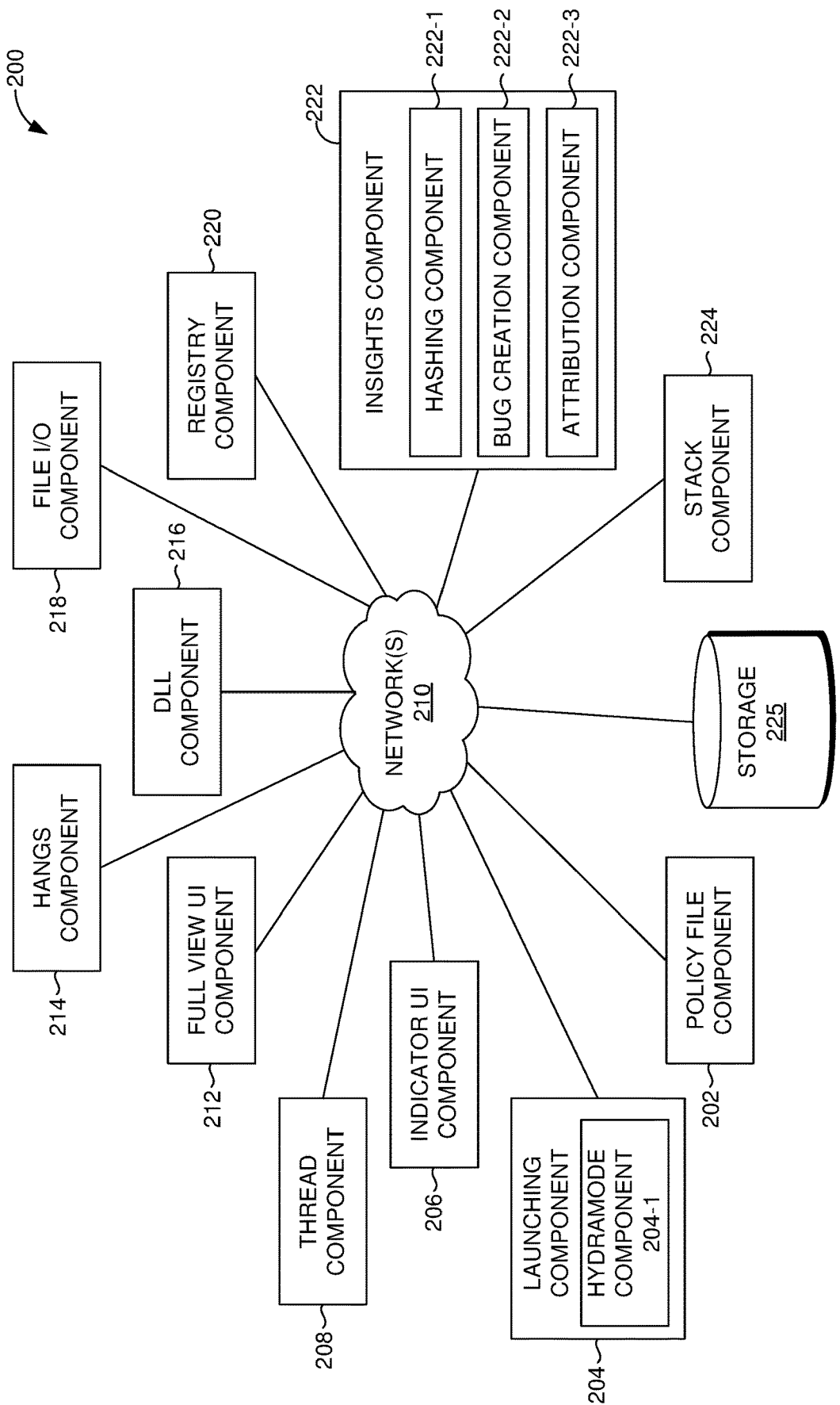
FIG. 2 is a block diagram of an example computing system architecture, in accordance with some embodiments.

Operating environment 100 can be utilized to implement one or more of the components of the system 200, described in FIG. 2. Operating environment 100 also can be utilized for implementing aspects of process flows 1400, 1500, and 1600 described in conjunction with FIGS. 14, 15, and 16, and any other functionality as described in FIGS. 2-13, and 17.

Referring now to FIG. 2, in conjunction with FIG. 1, a block diagram is provided showing aspects of an example computing system architecture suitable for implementing an embodiment of the disclosure and designated generally as the system 200. Generally, embodiments of system 200 enable or support a performance tool to detect performance issues, generate unique hashes representing performance issues and associated call stacks, and logging bugs, among other things. System 200 is not intended to be limiting and represents only one example of a suitable computing system architecture. Other arrangements and elements can be used in addition to or instead of those shown, and some elements may be omitted altogether for the sake of clarity. Further, as with operating environment 100 of FIG. 1, many of the elements described herein are functional entities that may be implemented as discrete or distributed components or in conjunction with other components, and in any suitable combination and location. For instance, the functionality of system 200 may be provided via a software as a service (SAAS) model, e.g., a cloud and/or web-based service. In other embodiments, the functionalities of system 200 may be implemented via a client/server architecture.

The policy file component 202 sets policies or thresholds that define performance issues. For example, a user may indicate in a policy file that a performance issue is not to be reported or displayed unless a hang is over a threshold quantity of hang time (e.g., 200 MS). The policy file is described in more detail below. The launching component 204 configures performance tool settings. For example, before an application or process is run, a user may indicate, via the launching component 204, the time at which the performance tool will attach or engage in performance readings for the application or process once the application or process runs. The hydra mode component 204-1 causes the performance tool to automatically run on top of potentially several processes when those processes are initiated or launched. For example, aETL file user can input several applications in a field of a graphical user interface, which causes the performance tool to automatically run upon the running of those several applications.

The indicator UI component 206 generates a summary view of each performance metric analyzed for a process. For example, the UI components can be a small window, UI, or dialog box that lists CPU utilization, number of hangs, memory utilization, number of modules running, number of threads running, number of performance issues detected, and the like. The summary view in certain aspects tends to be a shortened view with little text or strings relative to a full view user interface such that a user can quickly scan the indicator UI component 206 to get a general sense of process performance. Some embodiments of the UI component 206 are described in more detail below.

The thread component 208 detects a thread count and other information associated with a thread, which is described in more detail below in accordance with some embodiments. The full view UI component 212 generates a detailed view of performance metrics analyzed, call stack information, and performance issues detected. In some aspects, the full view UI component 212 provides a much more detailed information relative to the indicator UI component 206. In this way, for example, the user can see exactly where in a call stack the performance issue lies and if the performance issue has been logged as a bug by another team or user. Certain embodiments of the full view UI component 212 are described in more detail below.

The hangs component 214 detects the quantity of hangs that have occurred, the quantity of time that hangs have taken, and/or other information associated with hangs. Various embodiments of the hangs component 214 are described in more detail below. The DLL component 216 detects whether Dynamic-Link Libraries (DLL) have been loaded or unloaded and/or other information associated with DLLs. Some embodiments of the DLL component 216 are described in more detail below.

The file I/O component 218 detects the quantity of reads and/or writes to one or more files and/or other information associated with files. Some embodiments of the file I/O component 218 are described in more detail below. The registry component 220 detects a quantity of reads and/or writes to a registry or other data store where settings, options, or other values of an operating system can be changed or read. Various embodiments of the registry component 220 are described in more detail below. The insights component 222 detects performance issues and performs related functionality. The hashing component 222-1 generates a hash or other unique identifier for a performance issue and a set of related call stack frames. The bug creation component 222-2 generates a bug. For example, a user can select a link to create a bug that gets automatically routed to the correct team or user that created the code for which the performance issue was detected. In some embodiments, the attribution component 222-3 performs the automatic routing, which is described in more detail below. The stack component 224 generates stacks for performance metrics and/or performance issues. In some embodiments, the stack component 224 generates heat maps or other identifiers indicating performance issues, which is described in more detail below.

Example system 200 also includes storage 225. Storage 225 generally stores information including data, computer instructions (e.g., software program instructions, routines, or services), data structures, training data, and/or models used in embodiments of the technologies described herein.

By way of example and not limitation, data included in storage 225, as well as any user data, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; or other activity related information) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, date or information (e.g., the requested content) may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. Some embodiments of storage 225 may have stored thereon computer logic (not shown) comprising the rules, conditions, associations, classification models, and other criteria to execute the functionality of any of the components, modules, analyzers, generators, and/or engines of systems 200.

Figure 3:
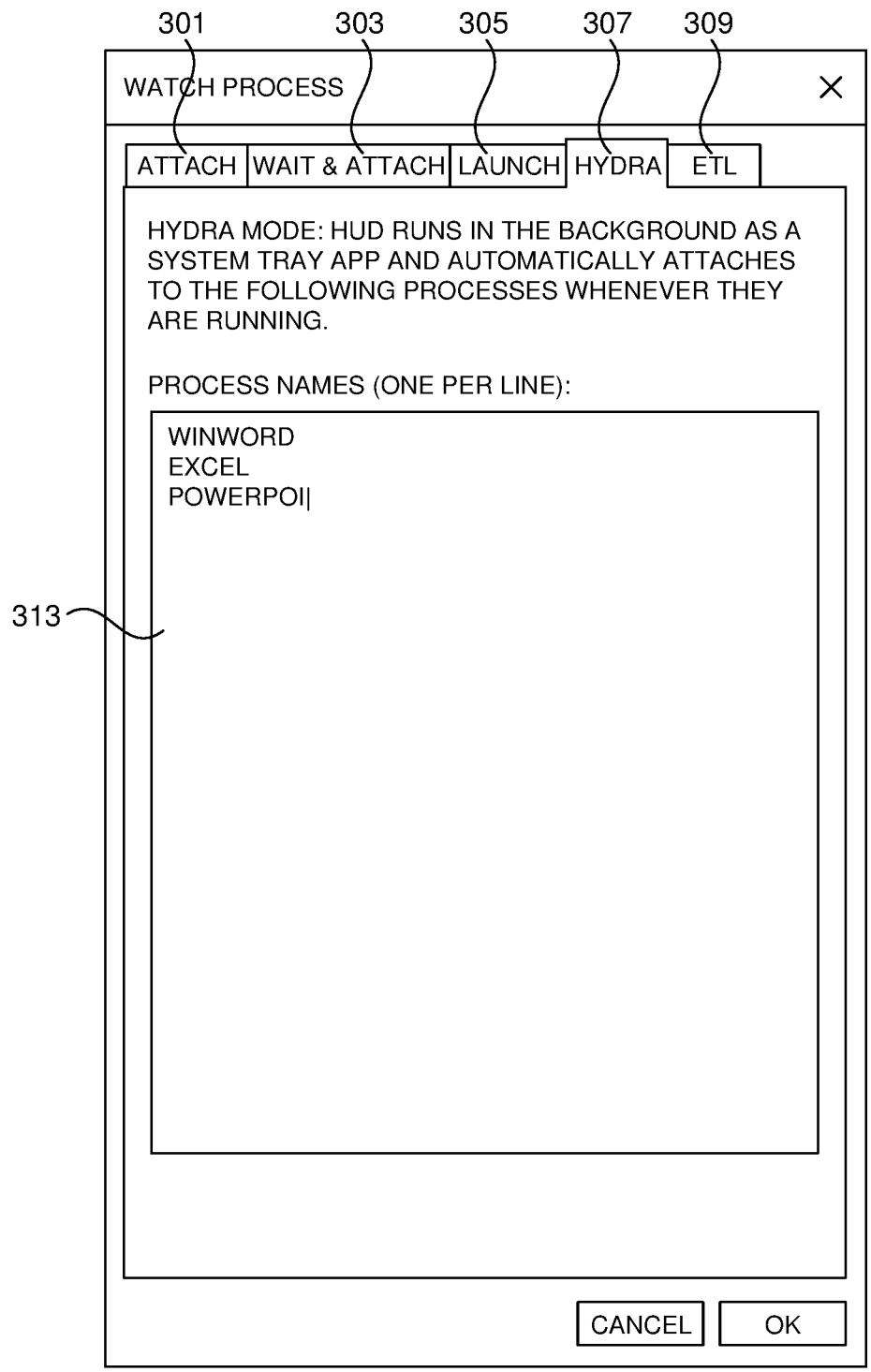
FIG. 3 is a screenshot of a user interface window illustrating how a performance tool can be launched, in accordance with some embodiments.

FIG. 3 is a screenshot 300 of a user interface window illustrating how a performance tool can be launched, according to some embodiments. In some embodiments, the launching component 204 of FIG. 2 generates the data and/or user interface of FIG. 3. In some embodiments, each screenshot described herein (e.g., FIGS. 3-13) are a part of a performance tool application stored on the user device 102a. Alternatively, in some embodiments, some or each screenshot described herein corresponds to a plugin, service, web application (e.g., the server 106). In particular embodiments, before a process or application launches or starts, a user can configure how a performance tool, which analyses the process, runs. The attach element 301 allows a user to select an existing process from a list defined in the field 313 or manually find an existing process. The wait and attach element 303 allows a user to define a process that is not yet running but that which the user desires to be processed by the performance tool at some future time. And when the process is launched, the performance tool automatically attaches and begins functionality (e.g., detects performance issues) based on the process being defined in the element 303. The launch element 305 allows a user to choose an EXE (executable file) to launch and immediately attach the performance tool to upon the EXE being opened. The ETL element 309 corresponds to "Event Trace Log" functionality, which allows an operating system to record application and OS system-level warnings, errors, or other events or performance issues to a binary file.

The hydra element 307 allows users to define a list of processes for the performance tool to engage, which causes the performance tool functionality to auto-attach or auto-generate performance metrics when the processes are launched, referred to herein as "hydra mode." This is unlike typical existing technologies that only allow users to launch a profiler tool in response to a user manually opening a single application. Hydra mode thus improves existing profiling technologies by auto-attaching to potentially several different processes upon process launch. As illustrated in the field 311, the user has listed the processes corresponding to WORD, POWERPOINT, and EXCEL. In some embodiments, the hydra mode functionality tracks session history (e.g., a timestamp of begin and end time) of every defined process in the field 313 or via the command line. A session may begin or have a beginning time stamp when the application launches and the session may stop or have an end time stamp when the user closes the application. In some embodiments, performance tool functionality automatically engages in the background (e.g., there is no user interface) in response to processes being defined via hydra mode. For example, performance is automatically tracked without regard to any user interface in response to the processes being defined. Alternatively, in some embodiments, performance tool functionality automatically engages and a user interface is shown, such as the screenshot 4A of FIG. 4. In this way, the performance tool is not intrusive whatsoever unless a user makes a selection to provide a user interface in particular embodiments.

Figure 4A:
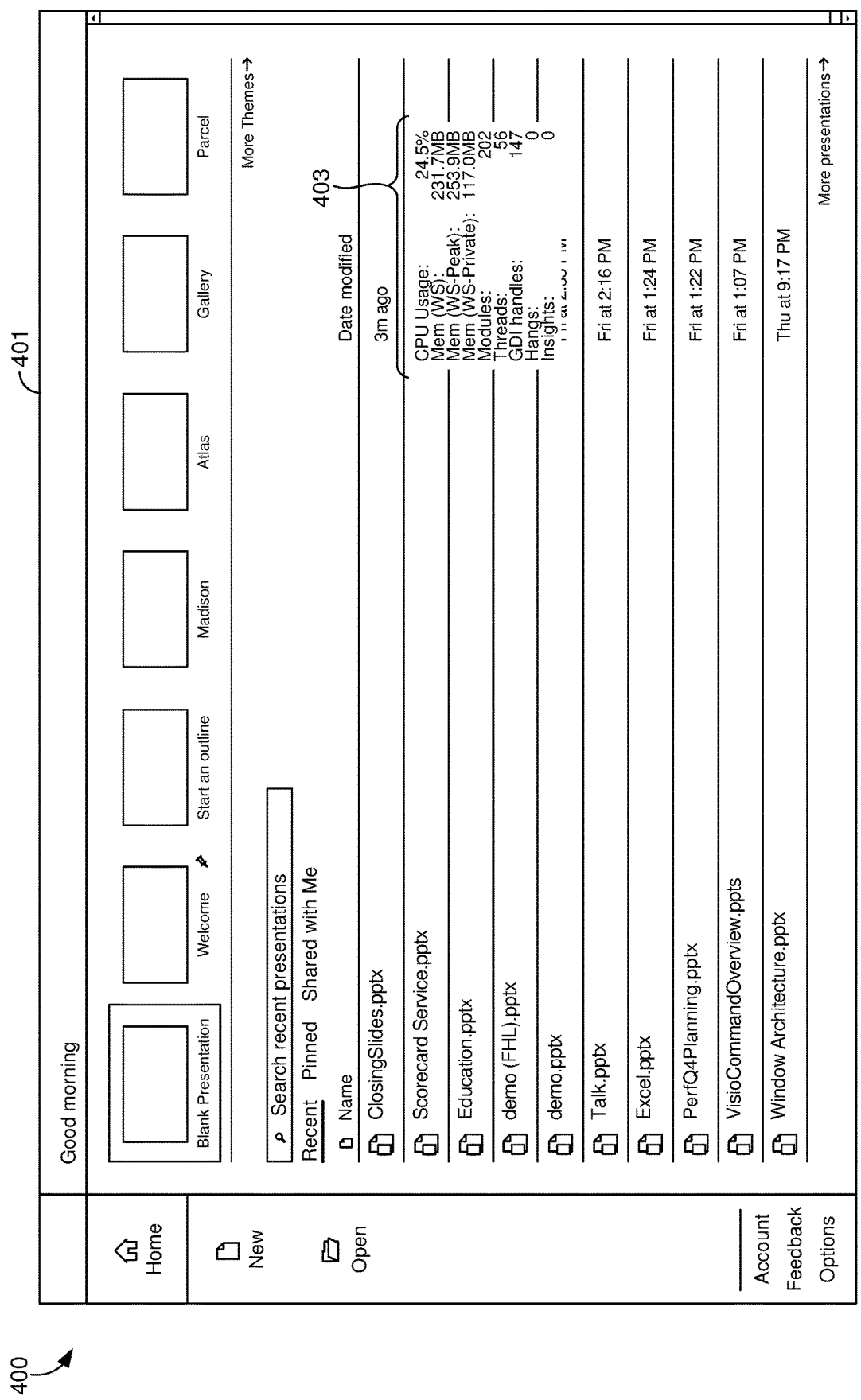
FIG. 4A is a screenshot that illustrates a transparent indicator window of performance metrics over an application, in accordance with some embodiments.
Figure 4B:
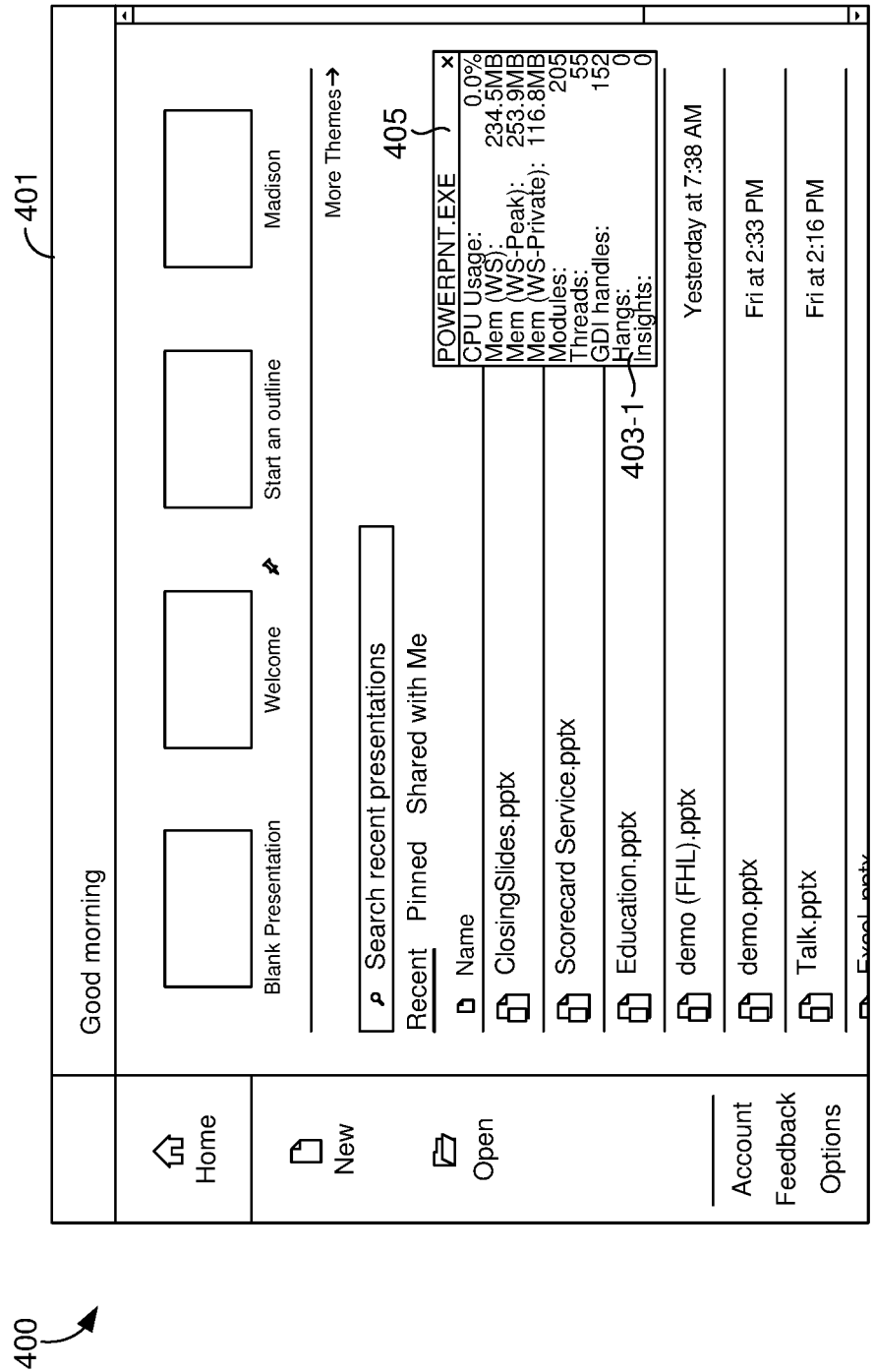
FIG. 4B is a screenshot illustrating a pronounced indicator window, in accordance with some embodiments.
Figure 4C:
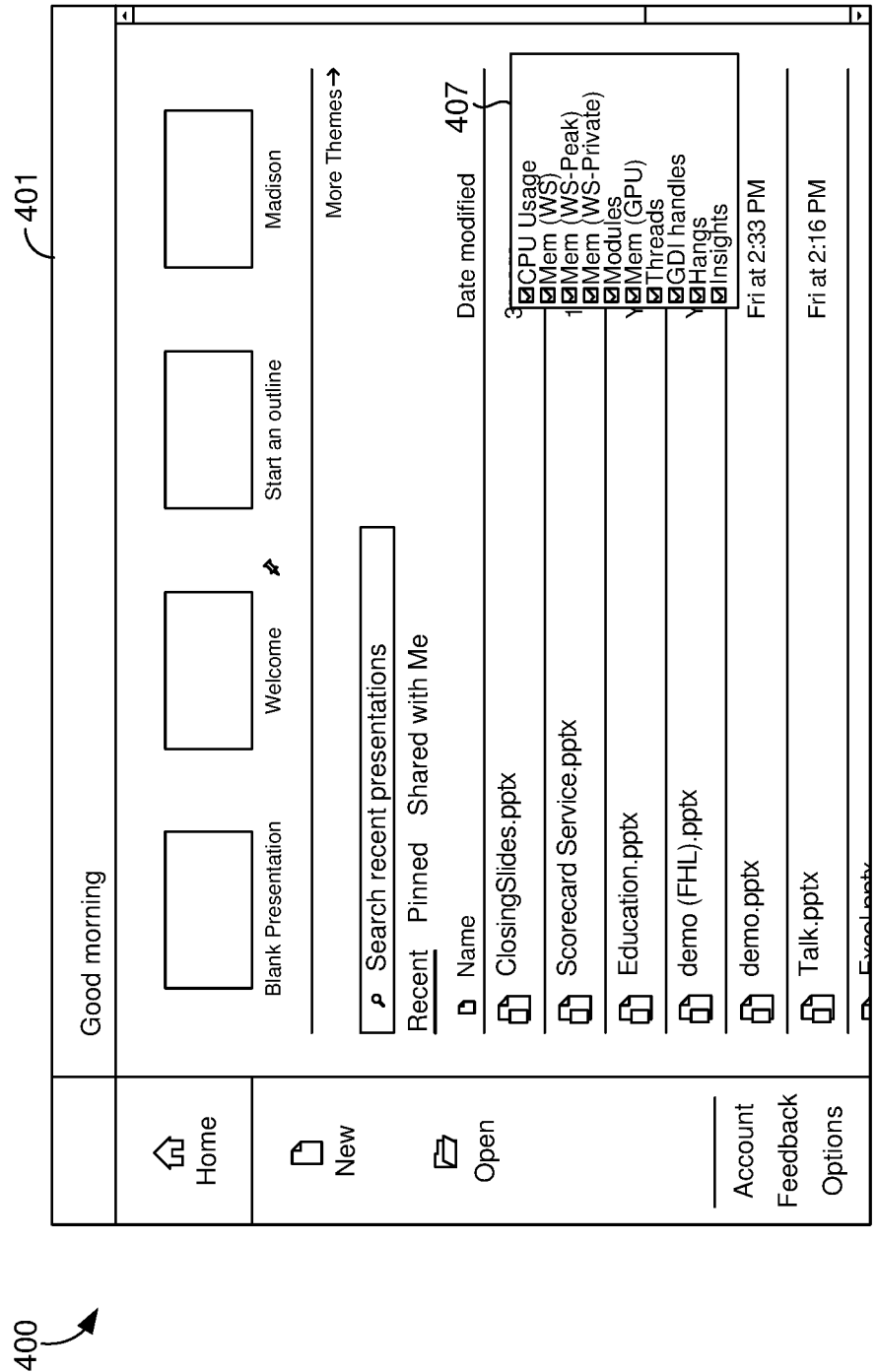
FIG. 4C is a screenshot illustrating that a user can select which resources or performance metrics the user wants the performance tool to track, in accordance with some embodiments.

FIGS. 4A-4C represent indicator window functionality that gives a brief performance summary in response to a process being launched, according to some embodiments. In some embodiments, the indicator UI component 206 generates the user interfaces and/or data of FIGS. 4A through 4E. FIG. 4A illustrates a transparent indicator window 403 of performance metrics over an application. In some embodiments, this functionality occurs subsequent to a user configuring the performance tool (e.g., via the launching component 204) and automatically in response to a user launching a process to be t tested. For example, a user may configure the performance tool via the user interface indicated in FIG. 3. Subsequently, the user may launch or open a POWERPOINT application 401 and automatically, the transparent window 403 is displayed (which is not embedded in the application 401 but sits on top of the application 401, as it is a different process). As illustrated, the transparent window 403 appears to not be a window at all but lists the resources and their performance metrics (e.g., hangs, threads). In this way, users are not distracted by it when they are testing or otherwise interfacing with the application 401.

FIG. 4B illustrates that the indicator window 403 becoming more pronounced or opaque (changing into window 403-1) in response to the pointer 405 hovering over or selecting the indicator window 403. In this way, the performance metrics become more pronounced. In some embodiments, when a performance issue is detected, the window 403 automatically and responsively changes to the window 403-1 or otherwise becomes pronounced so that there is a greater chance the user is aware of the performance issue. For example, the performance tool may detect a hang according to a policy. Responsively, the window 403 or 403-1 can explode twice its size or otherwise become larger so that it is more noticeable. Additionally or alternatively, the specific performance metric associated with the performance issue is highlighted (e.g., color coded) or otherwise prominently flagged. For example, the GDI handles and its value 138 may be color coded red if it is determined to be a performance issue.

In some embodiments, an indicator window (e.g., 403-1 and/or 403) is configured to be dragged to any location within an application such that anytime the application is dragged or moved, the indicator window maintains or "snaps back" to its position on the application. For example, referring to FIG. 4B, the user may drag, via the pointer 405, the indicator window 403-1 from the right side of the application 401 to the left side of the application 401. Subsequently, when a user moves the application 401 in any fashion, the indicator window 403-1 snaps to its position on the left side of the application 401 where the user originally dragged it.

FIG. 4C illustrates that a user can select which resources or performance metrics the user wants the performance tool to track. Thus, the dialog box 407 allows a user to select fields corresponding to CPU usage, different types of memory utilization, thread counts, GDI handles, hangs, and insights (i.e., quantity of performance issues detected) in order to provide the performance tool input resources to monitor and provide the user interface with metrics so that the user can view them. In some embodiments, the dialog box 407 is caused to be displayed in response to a right click or other selection of the indicator window 403-1. And when the user makes the selections in the dialog box, the change is automatically reflected in the indicator window 403-1.

Figure 5:
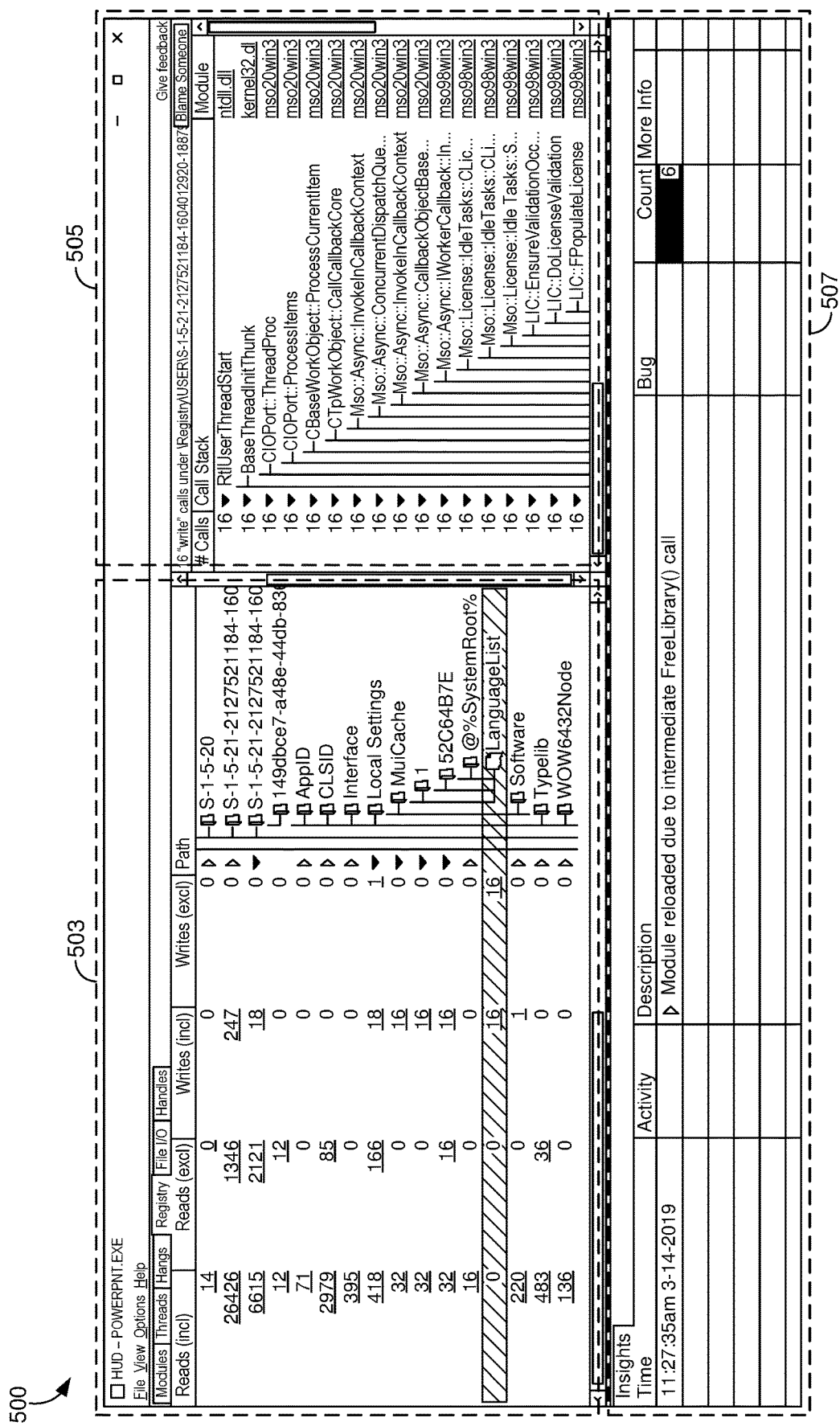
FIG. 5 is a screenshot of a user interface that illustrates the performance metrics, the call stacks of the particular performance metrics selected, and the performance issues that are detected, in accordance with some embodiments.

FIG. 5 is a screenshot 500 of a user interface that illustrates the performance metrics, the call stacks of the particular performance metrics selected, and the performance issues that are detected. In some embodiments, the full view UI component 212 generates the UI and/or determines the data within FIG. 5. In some embodiments, the screenshot 500 represents the "full view" as described herein, such that a user does not have to drill down various layers to see sets of information, which improves existing technology tools, where users would have to for example, drill down several layers of a user interface to see a call stack or different performance metrics. In some embodiments, the screenshot 500 is automatically provided for display in response to the user selecting any portion of the window 403-1 (or 403) of FIG. 4. In this way, the screenshot 500 allows the user to get a more detailed view of performance and any performance issues detected in a quick, readily available view.

Section 503 of FIG. 5 displays the resource identifier (e.g., tab, such as "modules," "threads," "hangs," "registry," "file I/O", and "handles") or Key Performance Indicators (KPI) that have been defined by a user for the performance tool to analyze. A selection of any of the resource identifiers cause more detailed information or metrics to be displayed in the section 503 for the selected resource identifier, which is described in more detail herein. In some embodiments, these resource identifiers are caused to be displayed based on what metric the user selected in the window 407 of FIG. 4. As described above, these resource identifiers or tabs are oriented in an intuitive way, which means that the user can easily and quickly analyze different performance metrics, which improves existing technology user interfaces, which require tedious navigation and drilling. In some embodiments, the resource identifiers and associated functionality are extensible, such that an extension or plugin can be generated for the particular performance or resource needed to be monitored according to the specific application. For example, a plugin can be generated and added to the section 503 called "GPU," (e.g., another tab), which allows GPU utilization to be monitored.

Section 505 of FIG. 5 displays a call stack associated with the resource identifier selected in the section 503. For example, as illustrated in FIG. 5, a user has selected a record in the section 503 where there has been 16 writes. In response to this selection, the section 505 can display each of the calls (16) or writes made. The insights section 507 displays performance issues or insights that the performance issue tool has detected. In some embodiments, user define policies, such as resource budgets, which when violated, will cause the performance issue and associated metadata to be displayed, as indicated in the section 507. The section 505 is described in more detail herein.

Figure 6:
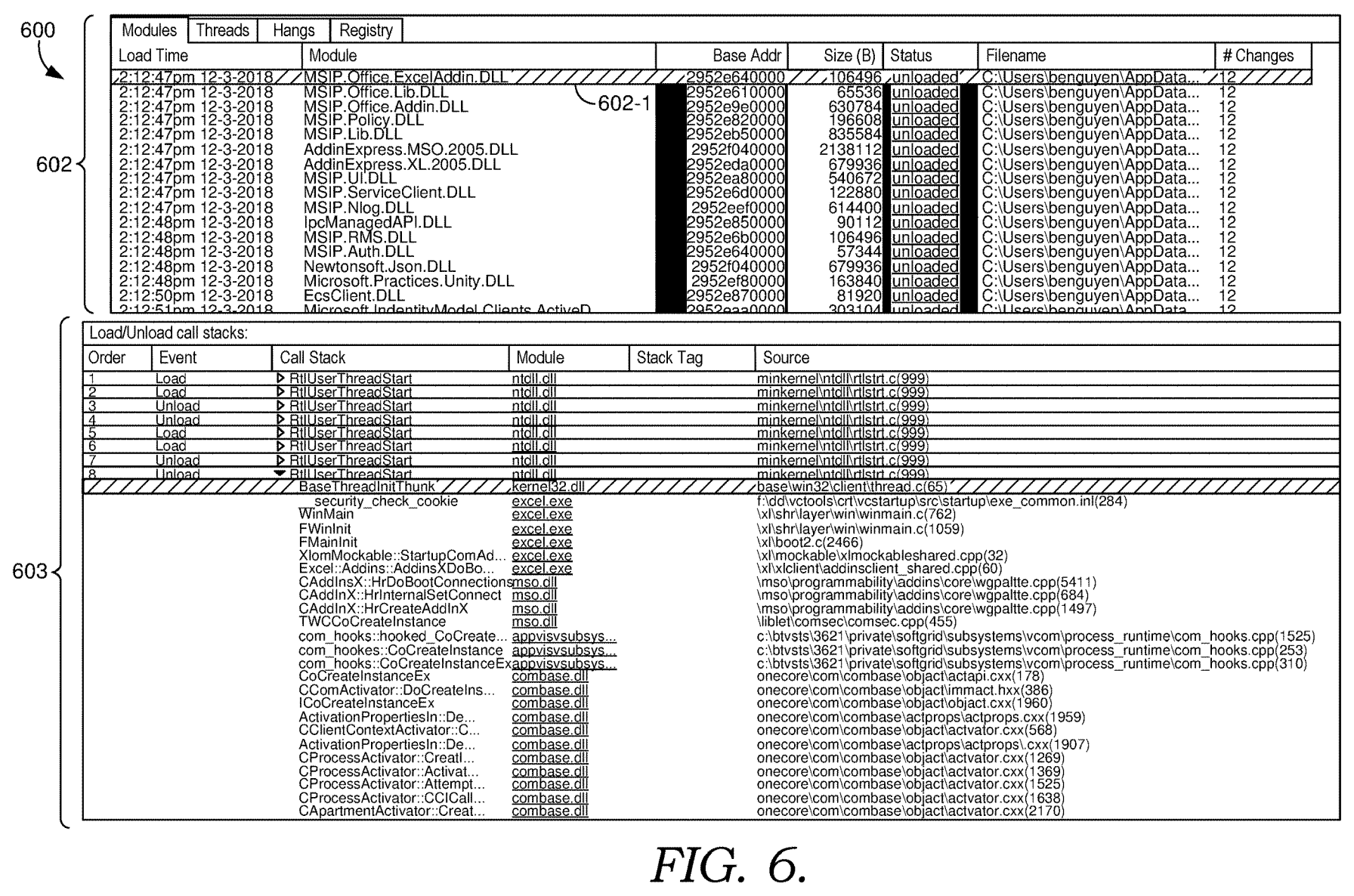

FIG. 6 is a screenshot 600 of a user interface illustrating a history of Dynamic-Link Libraries (DLL) activity and attributes them to a corresponding call stack. In some embodiments, the DLL component 216 generates the user interface and/or determines the data in FIG. 6. In some embodiments, the screenshot 600 is displayed in response to a selection of the "modules" tab, as illustrated in the section 503 of FIG. 5. A DLL is a library that contains code and data that can be used by more than one program at the same time. For example, in WINDOWS OS, the Comdlg32 DLL performs shared dialog box related functions. Each program can use the functionality that is contained in this DLL to implement an open dialog box. This promotes modularization or separation of code into components, code reuse, efficient memory usage, and reduced disk space.

FIG. 6 illustrates a historical list of DLLs that have been loaded and unloaded. Each record in the section 602 corresponds to an individual module or component. In some instances, performance issues may arise when a DLL was loaded when it should not have been loaded and vice versa or is associated with too many loads or unloads. For example, a first module may load at a first time, unload (e.g., via a free library) at a second time subsequent to the first time, and then load again subsequent to the second time, which is indicative of a performance issue because the second time load caused the DLL to run its initialization logic again. The first initialization was necessary, and so was the second initialization, but the redundancy caused extra time, memory, energy, and the like.

There are various attributes indicated in the section 602. The "load time" attribute functionality determines the timestamp at which the particular module was loaded or unloaded. The "module" attribute functionality determines the particular code module or component that was loaded or unloaded. The "base address" attribute functionality determines the virtual memory address of the DLL. The "status" attribute functionality indicates whether the DLL is loaded or unloaded, such as whether the DLL has changed from not loaded to loaded. The "size (b)" attribute functionality indicates the size of the module in bytes. The "filename" attribute functionality identifies the file path or directory tree of the module. The "#changes" attribute functionality corresponds to organizing the records within the section 602 based on the number of load or unloads for a particular module or set of modules.

In various embodiments, in response to a selection of a record (e.g., 602-1) within the section 602, the corresponding call stack (a load or unload call stack) is caused to be displayed in the section 603, showing each active function activity of the module. In some embodiments, the section 603 corresponds to the section 505 of FIG. 5. In this way, users can find the call stack instance (e.g., call stack frame) that is responsible for the DLL being accidentally loaded or unloaded. Per the section 603, the "order" attribute functionality determines the order that load or unload events were loaded or unloaded. The "event" attribute indicates the specific load or unload event. The "call stack" attribute functionality identifies the call stack of the load or unload event selected in the section 602-1. The "module" attribute indicates whether the particular module loaded or unloaded. The "stack tag" indicates the stack frame or stack column of the particular event selected in the section 603.

Figure 7:
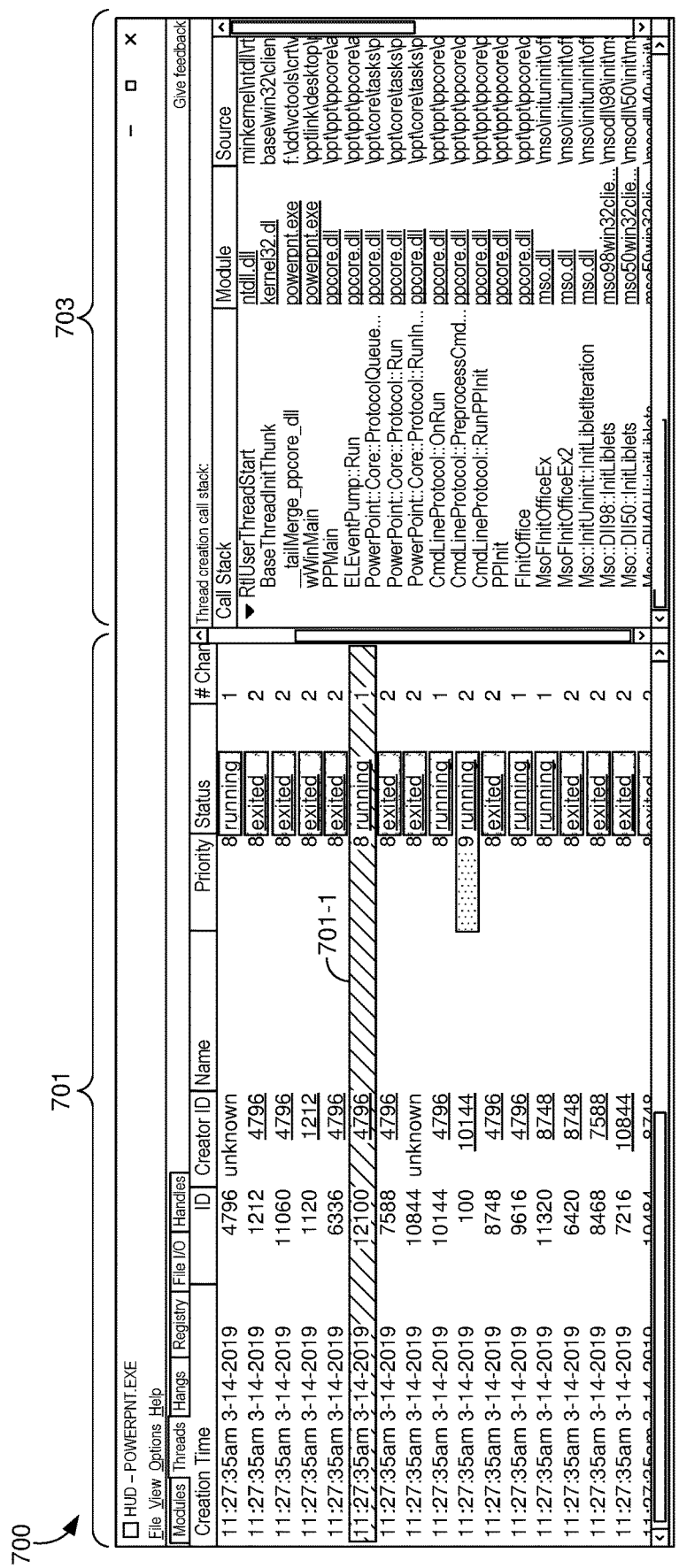
FIG. 7 is a screenshot of a user interface illustrating a history of threads created an exited during a performance tool session, in accordance with some embodiments.

FIG. 7 is a screenshot 700 of a user interface illustrating a history of threads created an exited during a performance tool session, according to some embodiments. In some embodiments, the thread component 208 generates the user interface and/or determines the data in the user interface of FIG. 7. In some embodiments, the screenshot 700 is displayed in response to a selection of the "threads" tab in the section 503 of FIG. 5. A "thread" is the smallest unit of processing and is made up of one or more processes. An individual thread can: contain a program counter that contains an address of the next instruction to be executed, have its own call stack, have a set of registers, and a unique ID. Threads typically do not run on their own but runs within a process or application.

Section 701 of FIG. 7 includes various attributes associated with threads. Each record corresponds to an individual thread and attribute information for that thread. For example, the "creation time" attribute corresponds to functionality that generates a timestamp for when a thread was created. The "ID" attribute corresponds to a thread ID genus. The "creator ID" attribute is indicative of a thread ID species of the genus. In some embodiments, in response to a selection of the "creator ID" element, the creator IDs are organized by their ID so that a user can see the quantity of specific threads generated. The "priority" attribute functionality determines a particular priority for running or executing. For example, priority can be represented by a number between 1 and 10, where the highest priority thread is 10 and the lowest priority is 1. Priority helps a thread scheduler determine the order in which threads are scheduled. Threads with higher priority or numbers typically run before and more frequently than lower priority and number threads. The "status" attribute functionality indicates whether a particular thread is currently "running" or has "exited" or stopped. The "#change" attribute functionality corresponds to a quantity of changes that a thread has undergone in terms of running and exiting, which is indicative of the quantity of times a thread has run and exited.

In some embodiments, in response to a selection of a record within the section 701, the call stack section 703 is displayed. For example, as illustrated in FIG. 7, when the record 701-1 is selected, the thread creation call stack is generated as indicated in the section 703. Accordingly, a user can see exactly where in the call stack the particular thread is running or exiting. The "module" attribute functionality corresponds to indicating what particular module the particular thread is a part of. The "source" attribute functionality corresponds to the particular process or application that the module belongs to.

Figure 8A:
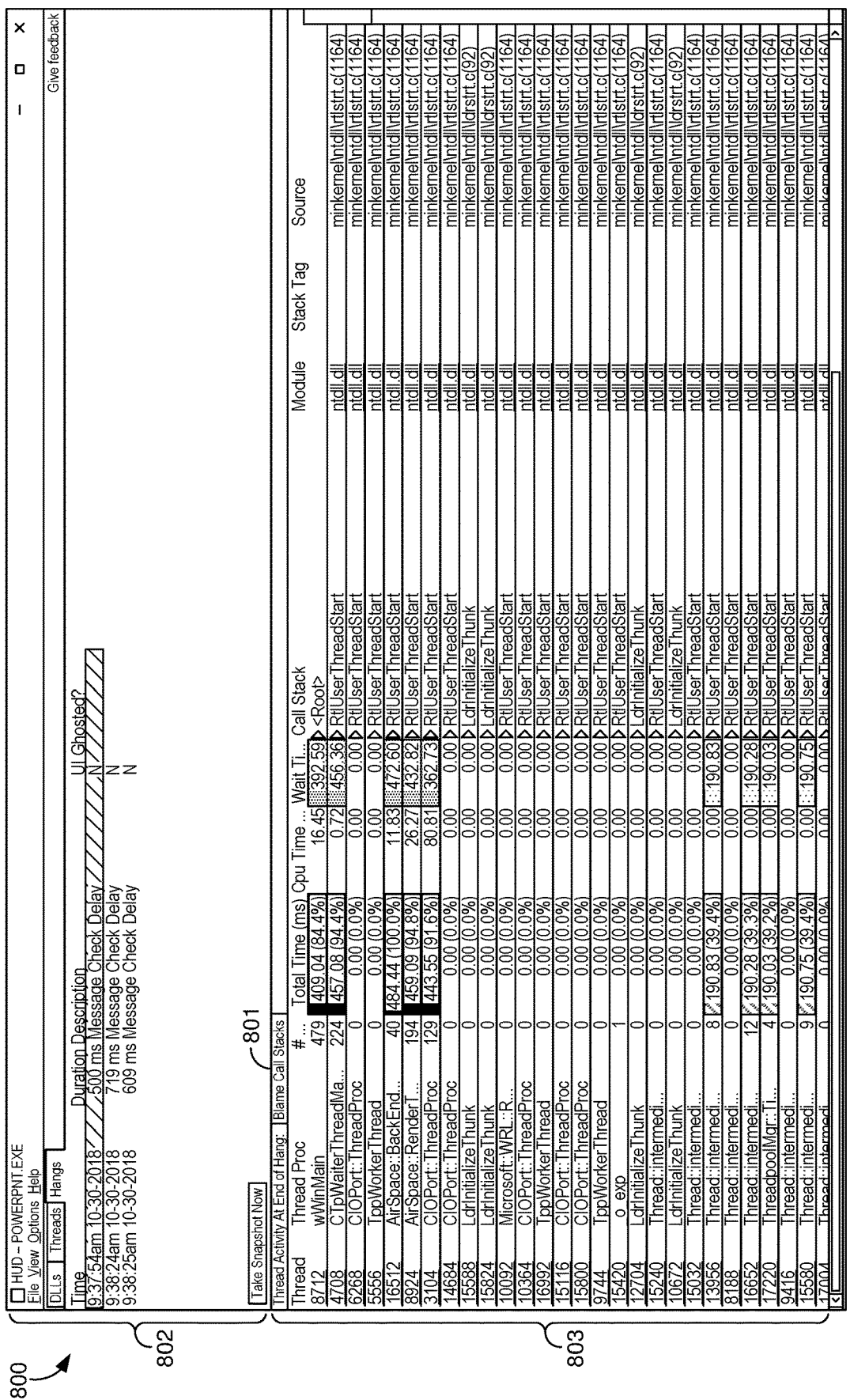
FIG. 8A is a screenshot of a user interface illustrating hang events and where they are occurring, in accordance with some embodiments.

FIG. 8A is a screenshot 800 of a user interface illustrating hang events and where they are occurring, according to some embodiments. In some embodiments, the hangs component 214 generates the user interface or determines the data in the user interface of FIG. 8. In some embodiments, the screenshot 800 is displayed in response to a selection of the "hangs" tab in the section 503 of FIG. 5. In various embodiments, each performance issue hang is illustrated in the section 802. Within the section 802, the "time" attribute functionality corresponds to a time stamp at which the hang performance issue was detected. The "duration description" attribute corresponds to functionality that describes the specific hand duration (e.g., "500 MS Message check Delay") indicating that a message was not checked fast enough according to a policy (e.g., within 200 MS). The "UI ghosted" attribute functionality corresponds to an OS-level concept where the OS will create a "ghost" window over the top of an unresponsive window that has a dimmed/frosted appearance with a responsive X (close) button so the user can forcefully close the underlying application. In this way, the user is always in control regardless of the application logic.

In some embodiments, in response to a selection of one of the records within the section 802, the data corresponding to the section 803 is displayed. Each record in the section 803 corresponds to a particular thread and associated hang attribute information. Accordingly, call stacks of different threads are merged to a single view (i.e., the section 803) so that it can be determined where, among various call stacks, one or more hangs were detected. As described earlier, in some instances there is a single call stack per thread. The "thread" attribution functionality indicates the specific Thread ID of the thread. The "thread proc" attribute functionality corresponds to an indication of where the starting address for a thread is. "Thread proc" corresponds to an application-defined function that serves as the starting address for a thread.

"Total time" attribute functionality (e.g., total hang time) automatically (without user intervention) determines what threads were active or processing during a hang, and indicates (without user intervention) this via color-coded functionality that serves as a "heat map" or different shades of one or more colors where the particular shade corresponds to the particular hang time (e.g., the "total time"). It is understood that color-coding is one example of ways to identifying the call stacks that are active or with the most hang time. Alternatively or additionally, in some embodiments, there may be other displayed functionality that indicates the records (threads, stacks) that are active or associated with the most hang time over a threshold. For example, this can be indicated via flags, pop-up windows, audible sounds and the like. This improves existing technology, as existing tools require users to manually identify performance hangs and other performance issues, which is described in more detail herein.

In various embodiments, the "total time" is determined by adding the "CPU time" and the "wait time". In some embodiments, the "CPU time" corresponds to the total range of time (e.g., in MS) the CPU is actually executing during thread or process execution and during the hang. In some embodiments, the "wait time" corresponds to the range of idle time (e.g., in MS) that the CPU is not executing during thread or process execution and during a hang. Typically, when threads or processes are executed, the CPU sits idle for at least a portion of time while data is fetch from I/O devices, such as a keyboard or waiting for the mechanical movements of the read/write head to find the correct sector and track on a disk. Accordingly, thread or process execution can be broken up into actual CPU utilization time and wait time. Therefore, combining the CPU time and the wait time gives an indication of the overall latency time. Accordingly, in some embodiments, the "wait time" is also color coded or otherwise marked in the user interface, which in some cases corresponds to the boundaries or hash of a performance identifier or set of stacks, as described in more detail herein. For example, as illustrated in the element 803 of FIG. 8A, the wait time call stacks are color coded darker relative to the other active threads representing the "total time."

Figure 8B:
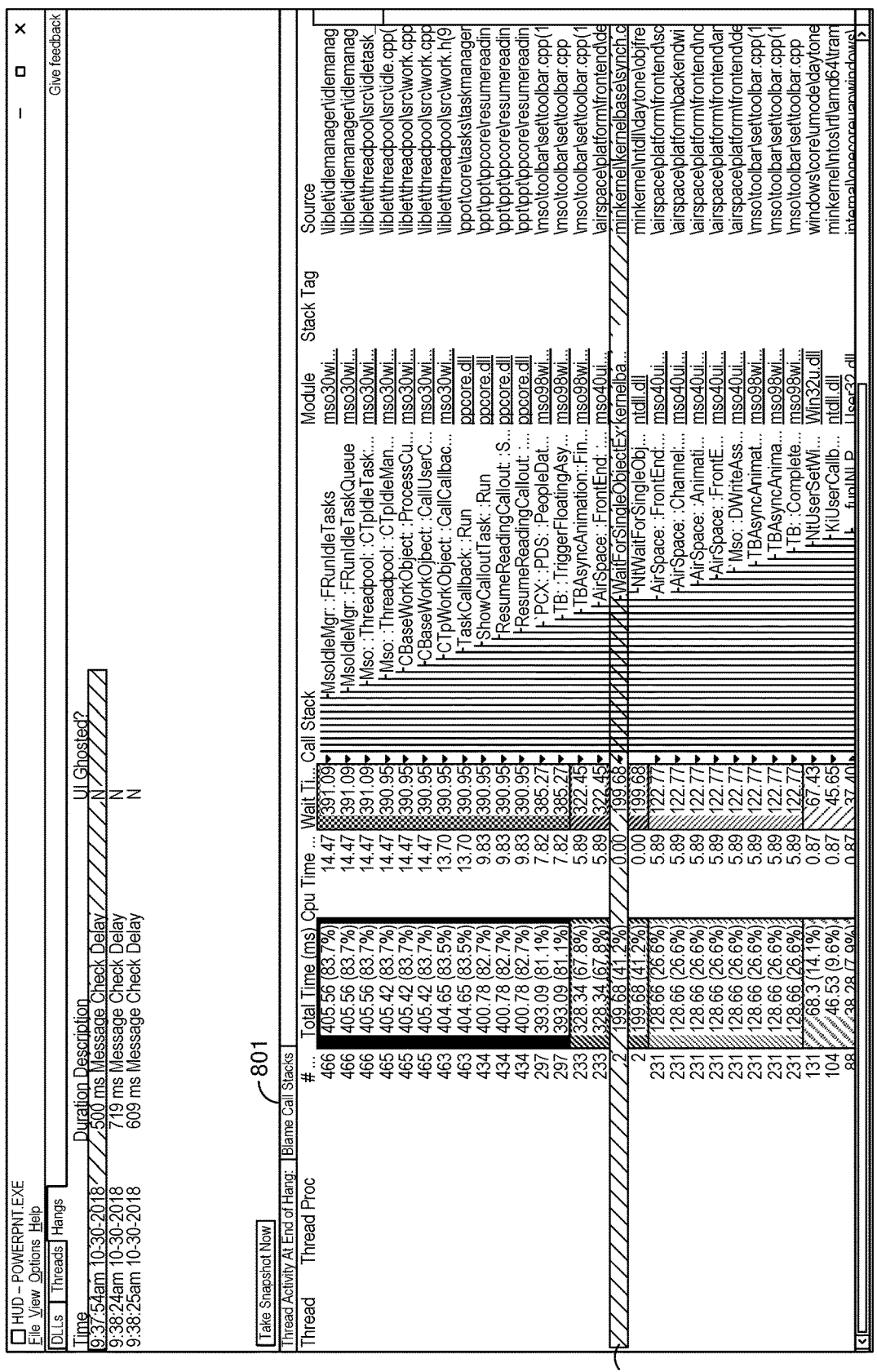
FIG. 8B is a screenshot of a user interface illustrating the hottest path or thread and corresponding call stack that has the greatest amount (or threshold amount) of hang time relative to other threads and/or call stacks of a process, in accordance with some embodiments.

The "call stack" attribute functionality indicates the call stack that belongs to the particular thread. The "module" attribution functionality indicates the module or component that the thread and call stack belong to. The "stack tag" attribute functionality indicates the stack frames for which the blame occurred, which is displayed, for example, when the "blame call stacks" element 801 is selected. In particular embodiments, in response to a selection of the "blame call stacks" element 801, FIG. 8B is displayed and indicates the "hottest path" or thread and corresponding call stack that has the greatest amount (or threshold amount) of hang time (e.g., total time and/or wait time) relative to other threads and/or call stacks of a process. Specifically, the call stack tags or frames are indicated as well as the specific call stack elements, such as functions, and their corresponding total time, CPU time, and wait time. For example, the record 805 indicates that the wait for the "single object" instance is waiting 322.45 MS for an animation instance associated with the record 807 to finish transitioning.

Figure 8C:
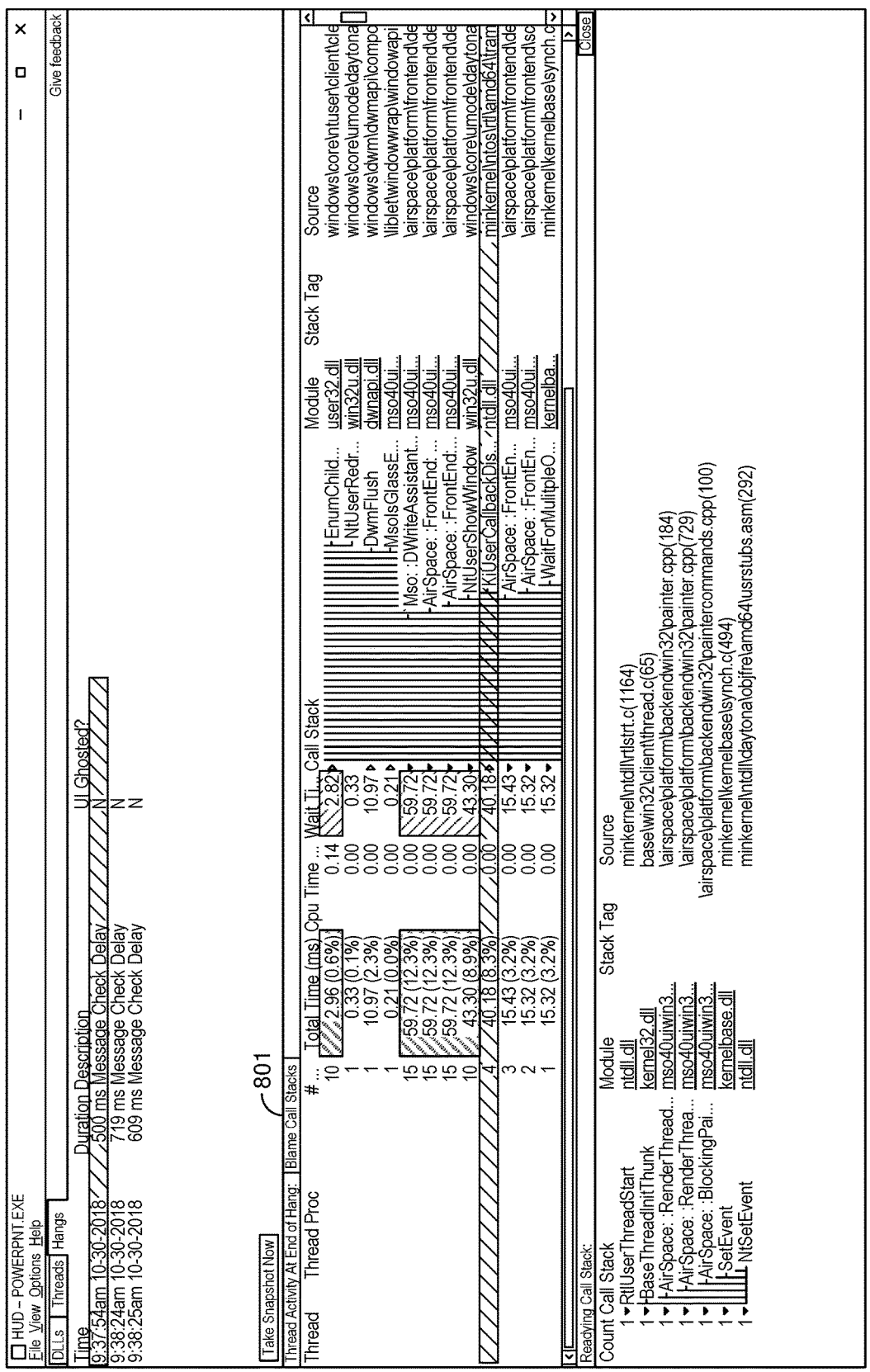
FIG. 8C is a screenshot of a user interface indicating what threads are blocking other threads during one or more hangs, in accordance with some embodiments.

FIG. 8C is a screenshot of a user interface indicating what threads are blocking other threads during one or more hangs, according to some embodiments. A thread is blocked when its execution is paused. Some threads block other threads because they need to finish processing or cannot be processed when other threads are processed first. In some embodiments, these threads are "readying threads," A "readying thread" is a thread that "readies" or unblocks another thread. In particular embodiments, the performance tool provides the readying thread so that a user can see what background work was blocking the thread where the hang was detected. For example, 8C illustrates 1 call to a render thread, and the "set event" thread unblocked the main thread to continue. Accordingly, users can see threads working together. In this way, these embodiments improve existing technology because users do not have to manually generate logging files (e.g., ETL file), which can be very disruptive to developer workflows. Logging files generate logs using the events from OS kernels. Instead, this functionality is provided via FIG. 8C, which allows a user to efficiently run a process, quickly identity the blocking threads, and fix or report the performance issue.

Figure 9:
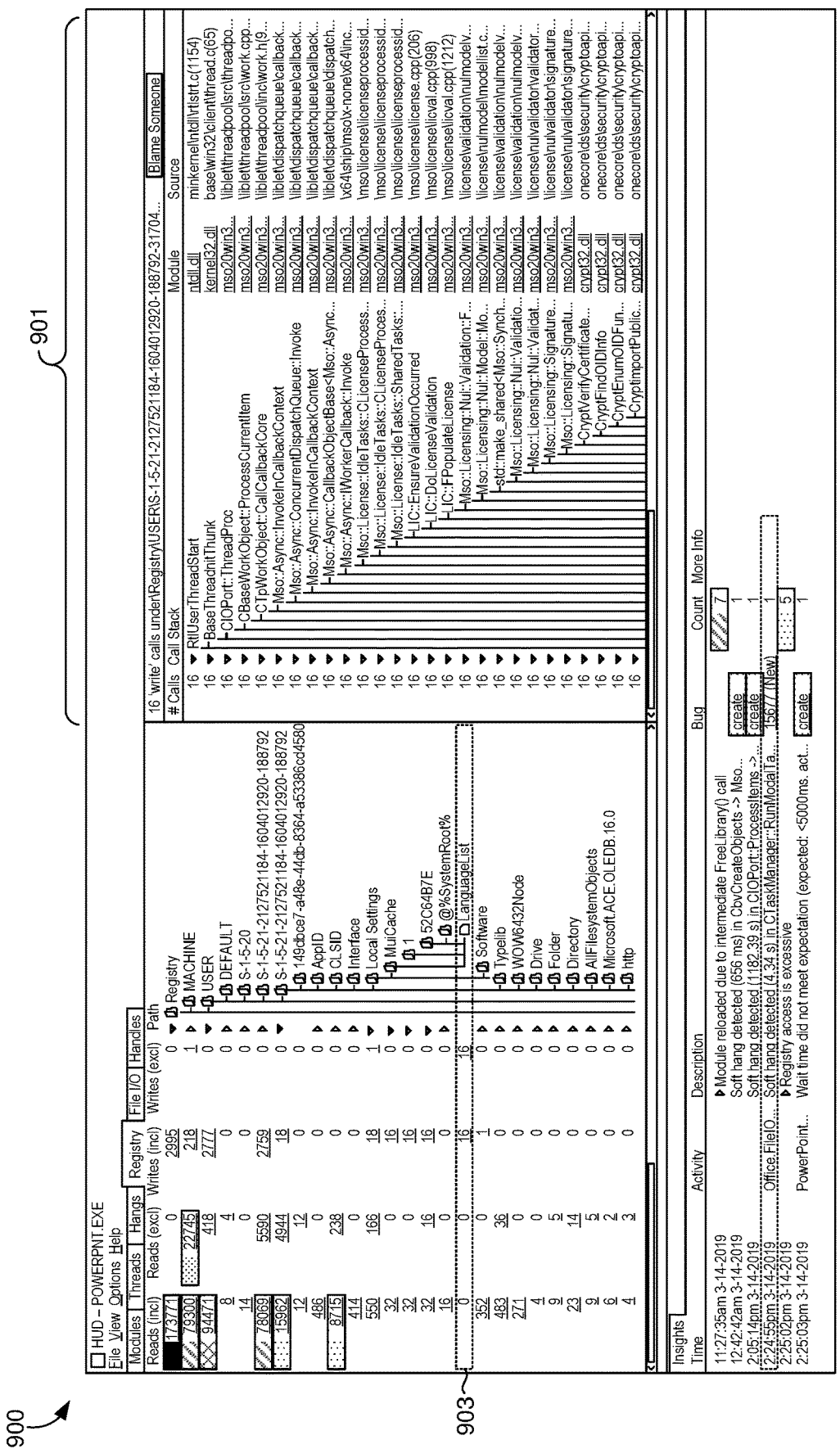
FIG. 9 illustrates a screenshot indicating various information associated with reads and/or writes of a process to a registry, in accordance with some embodiments.

FIG. 9 illustrates a screenshot 900 indicating various information associated with reads and/or writes of a process to a registry. In some embodiments, the registry component 220 provides the user interface or determines the data within the user interface of FIG. 9. In some embodiments, the screenshot 900 is displayed in response to a selection of the "registry" tab in the section 503 of FIG. 5. A "registry" is a database that stores information, settings, options, and/or other values of a MICROSOFT WINDOWS operating system, which can be configurable. However, the functionality and screenshot 900 need not be specific to registries or particular operating systems. Rather, in various embodiments, the associated functionality provides various read or write information of any suitable data store associated with settings, options, or other values of any operating system. Accordingly, in various embodiments, "registry" can simply be swapped out with another operating system configuration database. In some embodiments, the screenshot 900 is displayed in response to a selection of the "registry" resource identifier in the element 503 of FIG. 5.

The "reads" attribute functionality corresponds to how many read I/O operations were made to the registry. In various instances, there are one or more reads to the registry when a process is launched. The "writes" attribute functionality is indicative of how may writes there were made to the registry. In various instances, there are one or more writes when a user inputs data into the process. In some embodiments, a summary graphical user interface element, such as the indicator window 403, can indicate the total amount of I/O operations made to the registry (i.e., total quantity of reads and writes). The "path" attribute functionality corresponds to the specific registry keys, directories, and/or registry key paths (where each registry key is nested under the immediate left registry key) and the specific quantity of reads or writes made for the specific registry keys, directories, and/or paths. Section 901 indicates the call stacks of the particular registry key selected. For example, when a user selects the registry 903, section 901 may be displayed. In some embodiments, a selection (e.g., the right arrow key on a keyboard) can be made to open a registry key and walk down its folder structure such that each selection opens up a registry key and sub-registry key to view exactly where each read and/or write occur. In various embodiments, the performance tool tracks exclusive (excl) and inclusive (incl) writes and writes. An "exclusive" write or read as it relates to the screenshot 900 is a read and/or write only done on that key or value. An "inclusive" read or write as it relates to the screenshot 900 is a read and/or write done within a key's hierarchy (e.g., within any child keys of a key).

Figure 10:
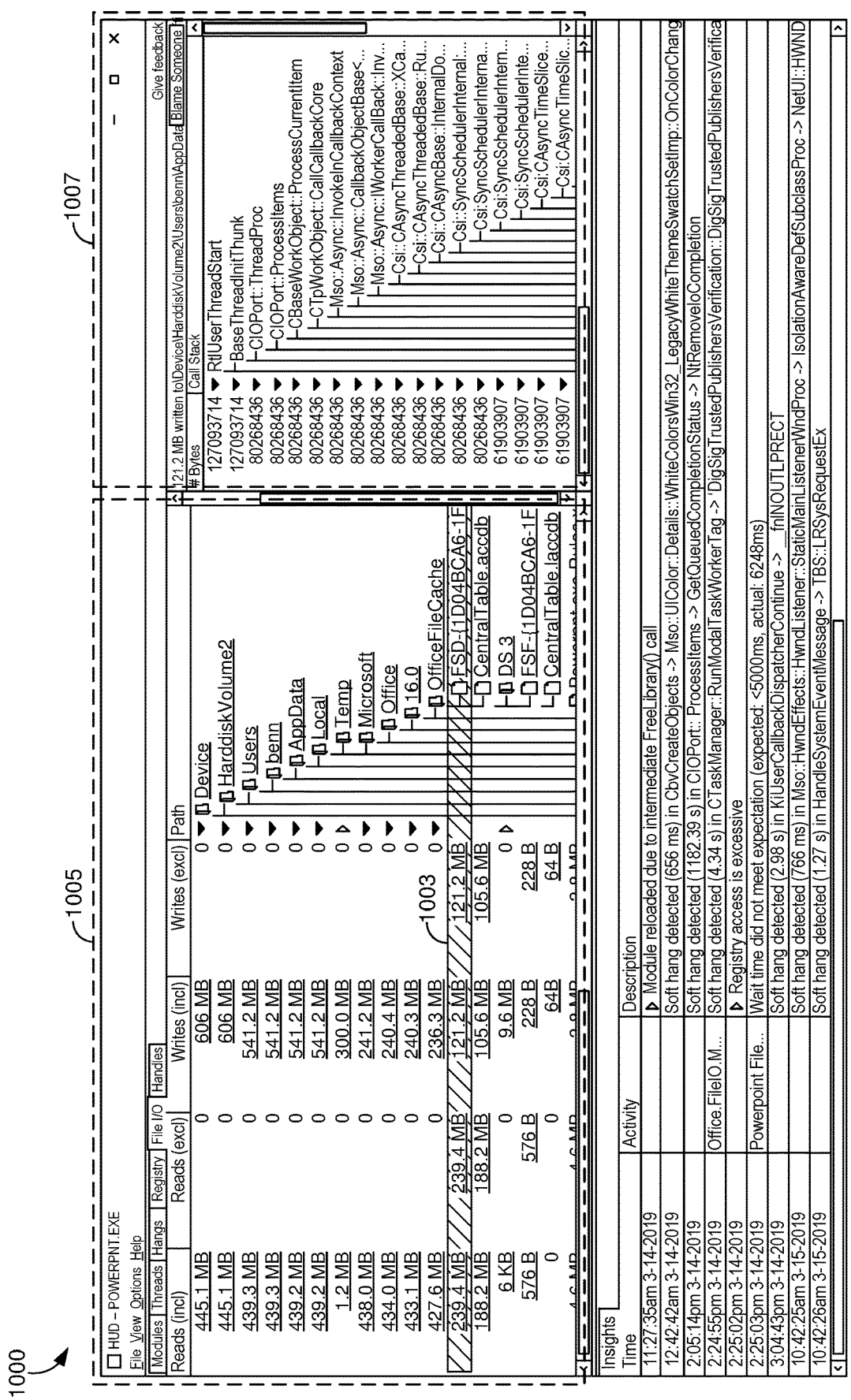
FIG. 10 is a screenshot of an example user interface that allows users to explore file access, in accordance with particular embodiments.

FIG. 10 is a screenshot 1000 of an example user interface that allows users to explore file access, according to particular embodiments. In some embodiments, the file I/O component 218 of FIG. 2 generates the user interface and/or determines that data within the user interface of FIG. 10. In some embodiments, the screenshot 100 is displayed in response to a selection of the "file I/O" resource indicator within the section 503 of FIG. 5. The resource/KPI section for file I/O is arranged in a folder view. The "read (incl)" attribute functionality indicates the quantity of bytes that are inclusively read from a particular directory or folder. An "inclusive read" as it relates to FIG. 10 is the quantity of bytes that are read from a particular directory and the directory's children or sub-folders or family in a hierarchy. The "read (excl)" attribute functionality indicates the quantity of bytes that are exclusively read from a particular directory or folder. An "exclusive read" as it relates to FIG. 10 is the quantity of bytes that are read from a particular directory without regard to the directory's children. The "write (incl)" attribute functionality indicates the quantity of bytes that are inclusively written to a particular directory or folder. An "inclusive write" in this context is the quantity of bytes written to a particular directory and the directory's children or family members in a hierarchy. The "write (excl)" attribute functionality corresponds to determining the bytes that occurred only to a particular directory without regard to the directory's children or other family members. The "path" attribute functionality provides the directories in a hierarchical view (showing directory children) within the section 1005 under the "path" attribute column. In some embodiments, in response to a selection of a record (e.g., the record 1003), another selection can be made (e.g., a right arrow key) to unwind the directory's hierarchy to walk down the folder hierarchy. For example, in response to a first selection, a first child's directory can be displayed under the parent directory. And in response to a second selection, a second child's directory can be displayed under the first child's directory and so on.

In some embodiments, in response to a selection of a record within the section 1005, such as the record 1003, the associated call stack is displayed in the section 1007. For example, in response to a selection of the record 1003, the system will merge call stacks that have read or written (exclusive and inclusive) to the FSD directory and the section 1007 will display all call stack fragments or frames that have performed the particular reads or writes indicated in the record 1003. In some embodiments, the directories indicated in the section 1005 under the "path" column are hyperlinks such that in response to a selection of the hyperlink, the file location is opened and a user can then open the file. For example, in response to a selection of the "Device" directory, a view of the Device directory can be displayed such that a selection of the directory causes the directory to be opened.

Figure 11:
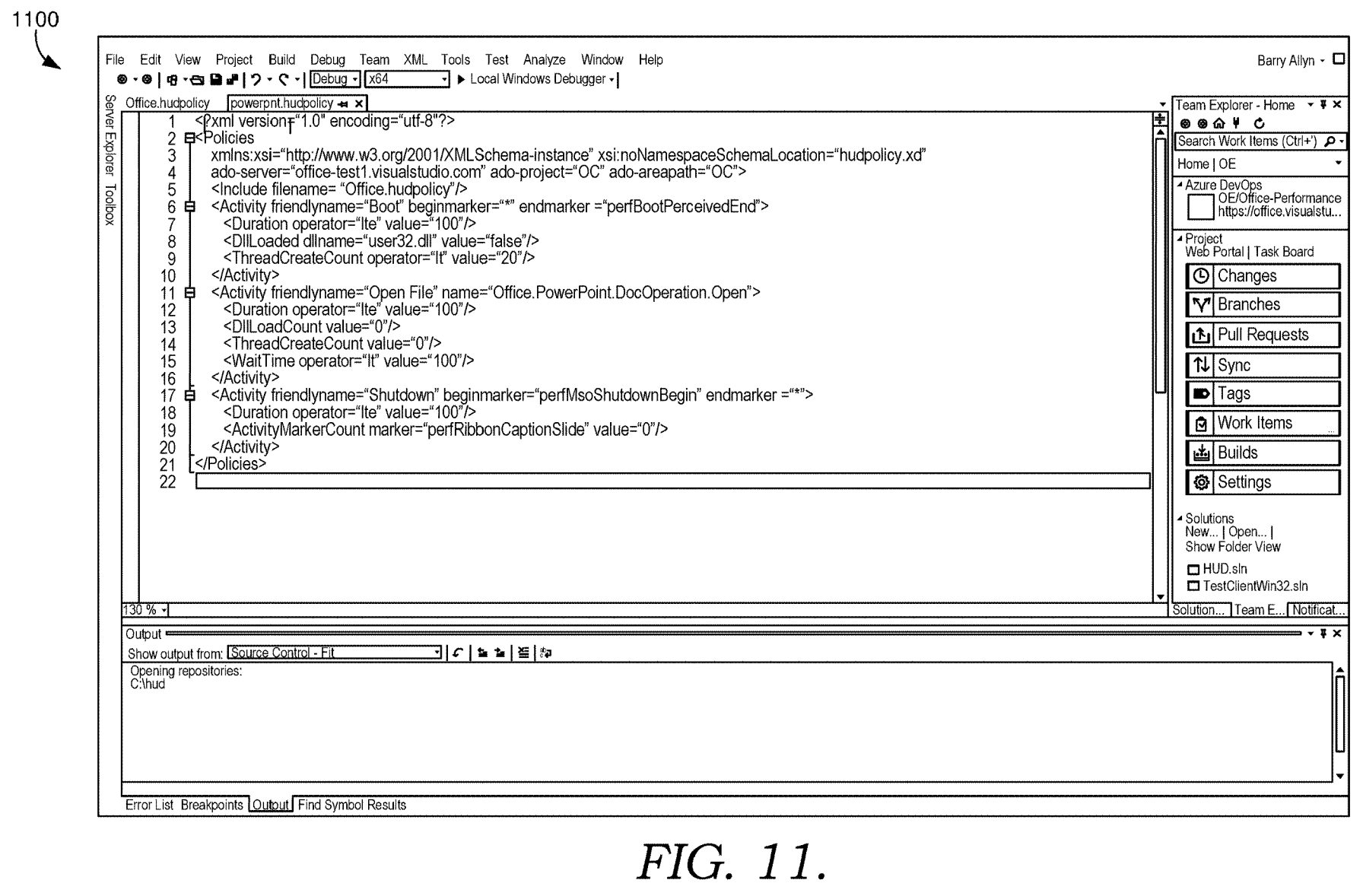

FIG. 11 is a screenshot 1100 of a policy file that is used to detect performance issues, according to some embodiments. In some embodiments, the policy file component 202 generates data associated with FIG. 11. In some embodiments, the performance issues displayed in the element 507 of FIG. 5 occurs in response to a user defining one or more policies in the policy file analogous to FIG. 11 and the system detecting such performance issues. A policy file indicates several activities that occur for a given process. For example, on lines 6, 11, and 17, the policy file indicates that there is a "boot" activity, an "open file" activity and a "shutdown" activity for a POWERPOINT process. In some embodiments, each activity is defined by a "begin" and "end" code marker. A "begin" code marker indicates the instance of code where an activity begins within a process and the "end" code marker indicates the instance of code where an activity ends within a process. For example, in FIG. 11, line 6, the "begin" code marker indicates that "*" is the beginning piece of code for the boot activity and the "end" code marker indicates that "perfBootPerceivedEnd" is the end code marker for the boot activity. In some embodiments, activities are alternatively or additionally defined by a name of an activity that automatically defines boundaries of the activity. For example, in FIG. 11, in lies 11 and 12, the name of the "open file" activity corresponds to "name=Office.Powerpoint.DocOperation.Open."

Within each activity a user can declare one or more policies that drive performance issue detection. For example, line 7 of FIG. 11 illustrates that the "boot" activity should have a duration less than or equal to 100 milliseconds. Accordingly, in response to a user requesting to open a process, if the boot activity is greater than 100 milliseconds, a performance issue is detected and displayed, such as displaying a performance insight into the element 507 of FIG. 5 as an individual record. In another example, line 8 of FIG. 11 indicates that the load budget (loaded/not loaded) for a given DLL ("user32.dll") within the boot activity should not be loaded (i.e., "value="false"). In yet another example, line 9 indicates that the thread count policy for the boot activity should not exceed 20. Accordingly, if the thread count exceeds 20, then the thread count becomes a performance issue.

In some embodiments, the policy file is used to route a bug or performance issue to a particular user or team of users. For example, a server address or path can be defined in the policy file such that the system automatically routes the bug or performance issue to the correct user in response to a bug being generated or the performance issue being detected so as to attribute performance issues or bugs with users that created the code for which the performance issue or bug was reported. For example, in response to a bug being logged, the system can contact the associated server, which then causes notifications to be displayed to user devices indicating that the particular bug has been detected. Accordingly, the user of the user devices can then responsively fix or patch the bug. Line 4 of FIG. 11 indicates the particular server and path that the bug or performance issue is routed to—"ado-server+"Office-test1.visualstudio.com" ado-project="oc ado-areapath="OC"," which occurs for all activity performance issues or bugs detected. Alternatively, in some embodiments, attribution can be made on a per-activity basis. This is because in some instances different teams or users develop or are otherwise responsible for different activities. Accordingly, for example, there may be a unique server or path for the "boot" activity, a different server or path for the "open file" activity, and yet a different server or path for the "shutdown" activity based on each of these activities being created by different teams or users.

In some embodiments, in response to the performance tool auto-attaching to a process, the performance tool queries a policy file, such as the one indicated in FIG. 11 to determine what the performance issues are. Responsively, in some embodiments, the performance tool functionality (e.g., the window 403) can begin.

Figure 12C:
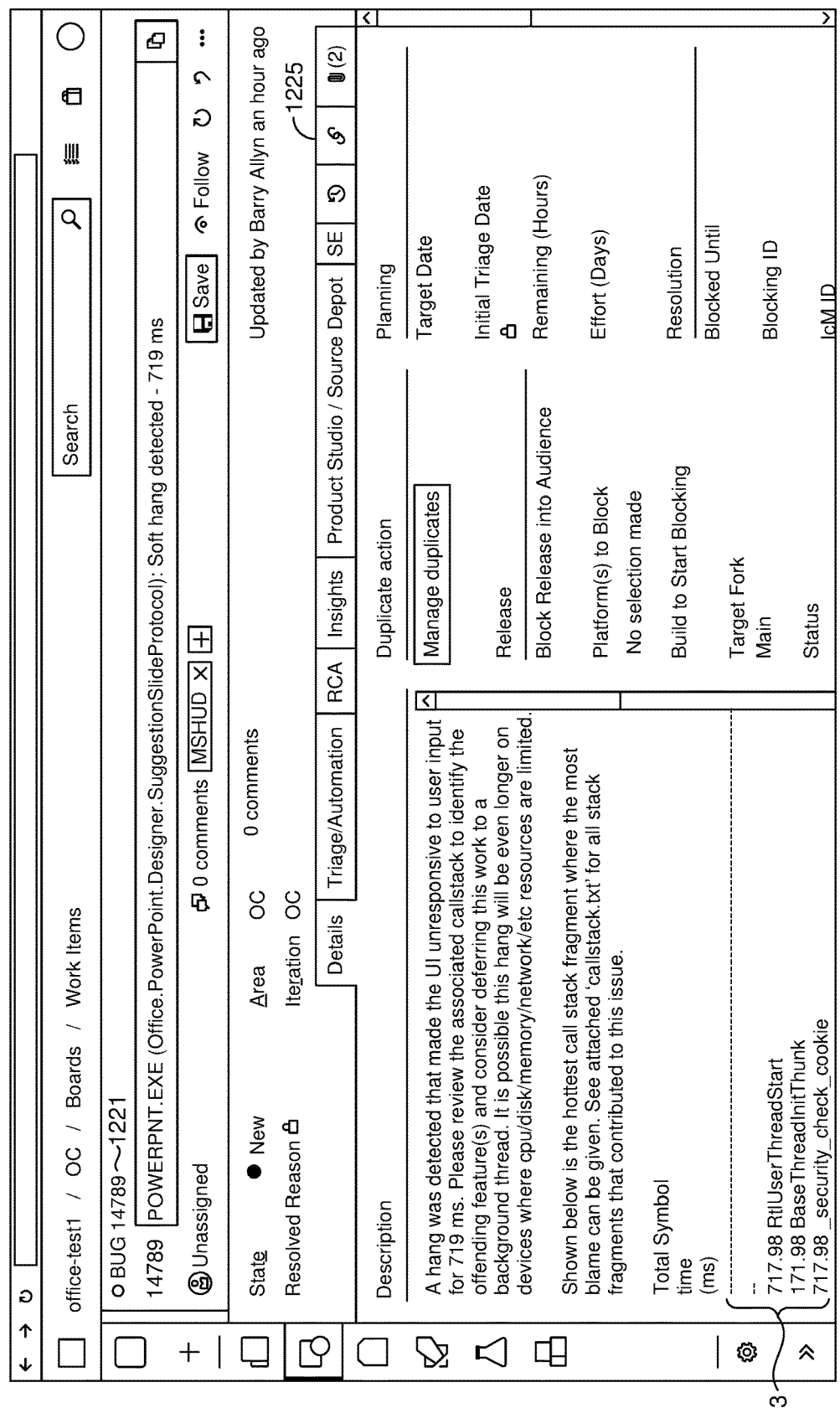
FIG. 12C is a screenshot of a user interface illustrating bug reports that are generated in response to a user generating a bug, in accordance with some embodiments.

FIG. 12A is a screenshot 1200 of a user interface indicating performance issues detected and bug generation functionality, according to some embodiments. In some embodiments, the insights component 222 generates the user interface and/or the data within the user interface of FIGS. 12A through 12D. In some embodiments, the screenshot 1200 represents the section 507 of FIG. 5. In some embodiments, after a user defines a set of policies for resources and server/path routing (e.g., as described with respect to FIG. 11), the policy issues are detected and caused to be displayed in the screenshot 1200.

The "time" attribute functionality generates the timestamp at which a performance issue is detected. Each record within the screenshot 1200 corresponds to a specific performance issue detected. The "Activity" attribute functionality indicates that activity that the performance issue belongs to, or more specifically, in what activity was the policy defined in a policy file that was violated. The "description" attribute functionality generates a short description of the performance issue detected. The "bug" attribute functionality indicates whether a bug has been created or logged by a user for the performance issue detected or whether the bug has not been created or logged by a user for the performance issue detected. The "create" identifier indicates that a bug has not been created or logged before. The "New" identifier (e.g., 15677 (New)) indicates that a bug has already been created or logged before. In this way, the performance tool allows the crowdsourcing of bug generation so that bugs can be generated faster and routed to the correct team or users faster. In some embodiments, a performance issue becomes a "bug" when the user creates a bug, as described in more detail below.

The "count" attribute functionality corresponds to the quantity of times that the performance issue has been detected. For example, a process may have been run several times (e.g., 12), each by an individual user or team. And each time the process has been ran, a specific performance issue has been detected. Accordingly, the system may include counter logic that counts each time the specific counter logic detects the performance issue and responsively provides the count under the "count" attribute in the screenshot 1200 (e.g., displaying the number 12).

In an illustrative example, record 1201 indicates that: a unique identifier representing a soft hang performance issue was detected at 3:04 p.m., the soft hang performance was defined in the "PowerPoint file" activity, the soft hang has not been logged as a bug before (via the "create" identifier) and it has been detected twice. In some embodiments, in response to a selection of the record 1201 (or any record within the screenshot 1200), the call stack associated with the record 1201 is displayed within the element 505 of FIG. 5. In this way, specific instances of code can be identified where the performance issues were detected.

FIG. 12B is a screenshot 1200-1 indicating bug creation functionality (e.g., performed by the bug creation component 222-2), according to some embodiments. In some embodiments, in response to the user selectin a "create" hyperlink under the "bug" column of the screenshot 1200, the screenshot 1200-1 is displayed. For example, in response to the user selecting (CTL+click) the "create" link for the record 1201, the screenshot 1200-1 is displayed. FIG. 12B is a prompt that requests the user to verify and confirm that this is a performance issue the user would like to log. The prompt also provides information for the user to consider before logging or generating the bug, such as making sure to add repro (bug reproduction) steps after the bug is generated.

FIG. 12C is a screenshot 1200-2 of a user interface illustrating bug reports that are generated (e.g., via the attribution component 222-3) in response to a user generating a bug. In some embodiments, in response to a user selecting the "yes" button 1213 of FIG. 12 B (or create link of FIG. 12A), a report is automatically generated and routed to the correct team or user based on the server or path identified in a policy file (e.g., the server and path indicated in the policy file on line 4 of FIG. 11). For example, in response to a user selecting a "create" link of FIG. 12A, the system can automatically generate system configuration (e.g., dxdiag files), resolve symbols to get the call stacks associated with the bug, and create a bug via an API (e.g., a rest API). This improves existing technologies that requires users to manually generate reports requiring several manual inputs. This report may contain all or some of the information as contained in the screenshot 1200-2. A reporting component may thus generate a bug ID 1221, which is 14789. The component may also provide the hottest path (the instances that contributed over a threshold amount to the performance issues/metrics) of the call stack where the performance issue was detected, as illustrated in the section 1223. One or more files may also be generated and in response to a selection of the attachment button 1225, the files may be displayed. For example, a first file may contain the full call stack of a thread (or merged call stack of several threads), not just the hottest path of the call stack of the thread. In another example, another file (e.g., a dxdiag.txt file) may be attached and contain system configuration information so that a bug can be reproduced. For example, the second file may include, machine name, machine ID, operating system, system manufacturer, system model, BIOS, processor, memory, user DPI settings, system DPI settings, page file, USB drivers, display settings, etc.

FIG. 12D is a screenshot of a user interface indicating that a bug associated with the performance issue of the record 1201 of FIG. 12A has now been generated, according to some embodiments. For example, in response to a selection of the yes button 1213 of FIG. 12B (or the "create" link of the record 1201 of FIG. 12A), not only is the bug created, but the status identifier changes from the "create" identifier to the "14789 (New)" identifier as indicated under the "bug" column and record 1201 of FIG. 12D. Thus, the screenshot 1200-3 represents the screenshot 1200 of FIG. 12A at a second time subsequent to the first time after a bug has been generated or logged. In some embodiments, when a user selects a bug that has already been logged or created, the report that was generated for the bug is provided for display. For example, in response to a user selecting the "14789 (New)" identifier under the "Bug" column, the report as illustrated in FIG. 12C is automatically displayed.

In some embodiments, a set of stack units of call stacks where a policy issue has been detected are consolidated or reduced to a unique identifier or hash. This is useful because certain performance issues, such as hangs, can be associated with and violated in several call stack units. A system can potentially identify every single stack unit as a separate hang performance issue even though they are part of the same hang for the same thread. However, as described above, this wastes system resources, such as memory, and can be confusing for users who are trying to quickly resolve performance issues. It is burdensome on developers and users to constantly analyze a particular issue that is really supposed to belong to another performance issue the user or developer has already analyzed. Further, the hash or unique identifier needs to be as stable as possible over time, and thus needs to be immune to code churning and other code modification.

Moreover, these unique identifiers or hashes are also generated so that they can be compared with other unique identifiers or hashes in a bug data store. In some embodiments, in response to detecting a particular performance issue, these unique identifiers or hashes are generated. In this way, users can determine what bugs associated with performance issues have been generated for crowdsourcing purposes, as described above. For example, referring back to FIG. 12D, the unique identifier may correspond to the indicia 1478, indicating that a unique hash and its associated bug has already been logged.

In some embodiments, the unique identifiers or hashes are generated in a specific manner for hangs and other performance issues that can be reflected in multiple stack units even they are the same performance issue. For example, in some embodiments, the system (e.g., the hashing component 222-1) detects which stack units account for a threshold proportion (e.g., percentage) of the performance issues for the entire call stack, their quantity, and determines where in the call stack the actual call stacks that violate performance are located, and based on this information, a hash is generated. For example, this is specifically illustrated in FIG. 13A for hang performance issues. In various embodiments, the functionality performed in FIG. 13A is performed by the hashing component 222-1.

The code in FIG. 13A illustrates a function "CalculateHangCRC" that calculates a Cyclic Redundancy Check (CRC) for a set of stack units where performance issue hangs were detected. CRC is a hash function that detects changes in data over a threshold. In CRC, a fixed quantity of check bits or checksums are appended to stack units where there was blame over a threshold. In this way, when other hashes are generated for future hang issues, the CRC can be computed and the checksums are compared against other checksums to indicate whether the hang performance issue has already been logged. For example, referring back to FIGS. 12A and 12D, the "bug" column may indicate the unique identifier 14789 corresponding to the hash. The hash of this unique identifier (or the unique identifier itself) may be compared against other hashes to determine whether a bug has already been logged and responsively provide the indication under the "bug" column, such as "create" (no hash matches) and "15677 (New)" (hash match).

The algorithm illustrated in FIG. 13A has two overall steps. The first step is that for a set of edge deltas E={50%, 40%, 30%, 20%, 10%}, the stack frames that contain performance issues (B) (called "blame frames") where parent stack frame and child stack frame differ in cost>=E are computed. The "cost" is the percentage of drop (e.g., in milliseconds) from the parent stack frame to the child stack frame relative to the total time for the call stack (i.e., the total hang time). Mathematically, this can be represented as parent stack frame hang time subtracted by child stack frame hang time, which are both divided by the total hang time (e.g., the "total time" illustrated in FIGS. 8A and 8B). The first step thus determines a quantity of stack frames that account for a threshold percentage of the overall hang for the entire call stack. In some embodiments, the first step corresponds to configuring a threshold percentage of "wait time" of the "total time" as described with respect to FIGS. 8A and 8B For the second step, if the size of B (or the quantity of stack frames) is equal to 1 and the blame or performance issue is on the leaf node (corresponding to the stack frame on the bottom of the stack or the child node), the system computes a CRC for the unique symbols for the entire call stack, as opposed to only the stack frames that account for the threshold percentage of the hang performance issue. In this way, for example, when a performance issue is logged as a bug, each call stack frame takes on the same hash and is associated with the same performance issue. This accounts for the situation where, for example, "WaitForSingleObject" is where all of the time was spent, yet the blame really was with a feature further up the call stack that called the "WaitForSingleObject." In various instances, it is desirable to avoid blaming or attributing a performance issue to just the leaf stack frame since it may aggregate too many separate hangs together. Accordingly, the entire call stack is blamed or marked as a performance issue but with the tradeoff of CRC volatility. Continuing with the algorithm, If B is greater than 1 (e.g., over a threshold quantity count of 1), then the CRC is computed for the unique symbol names I B. These symbols represent the costliest blame frames in the hang stack. Continuing with the algorithm, if B is equal to 0, try the next edge delta, which is a finer grain. For example, the edge delta can switch from 50% to 40%, and the algorithm is repeated.

The CRC returned by the "CalculateHangCRC" function (and the "crcBasis' string which the CRC is based on) are used to uniquely identity performance issues logged in a bug data store (e.g., the storage 225). Therefore, in various embodiments the CRC algorithm does not change or else some or all of the detected hangs will cause new bugs to be logged and extra triage work for the team or user who receives a report of the bug (e.g., the report as indicated in FIG. 12C). The algorithm illustrated in FIG. 13A attempts to provide immunity to new stack frames and "noise" over time that can change the call stack signature. For example, the code is hardened where there is code refactoring where a new parent function is in the call stack which does not add new cost. In another example, where there are recursive calling patterns where the cost can appear at different levels of recursion, the generated hash is stable and hardened. In various instances it is desirable to favor blame frames where the edge between child stack frame and parent stack frame is the greatest. This helps to aggregate hang performance issues to a single feature rather than treat them as separate (bug duplicate) hangs. It is also desirable to not pin a performance issue to a single leaf node or bottom-most stack frame, as this will coalesce too many hangs into a single instance due to, for example, a "WaitForSingleObject" call. Accordingly, in various situations it is desirable to have multiple blame frames so that a feature (and its unique symbol names) will be blamed.

Figures 13B, 13C:
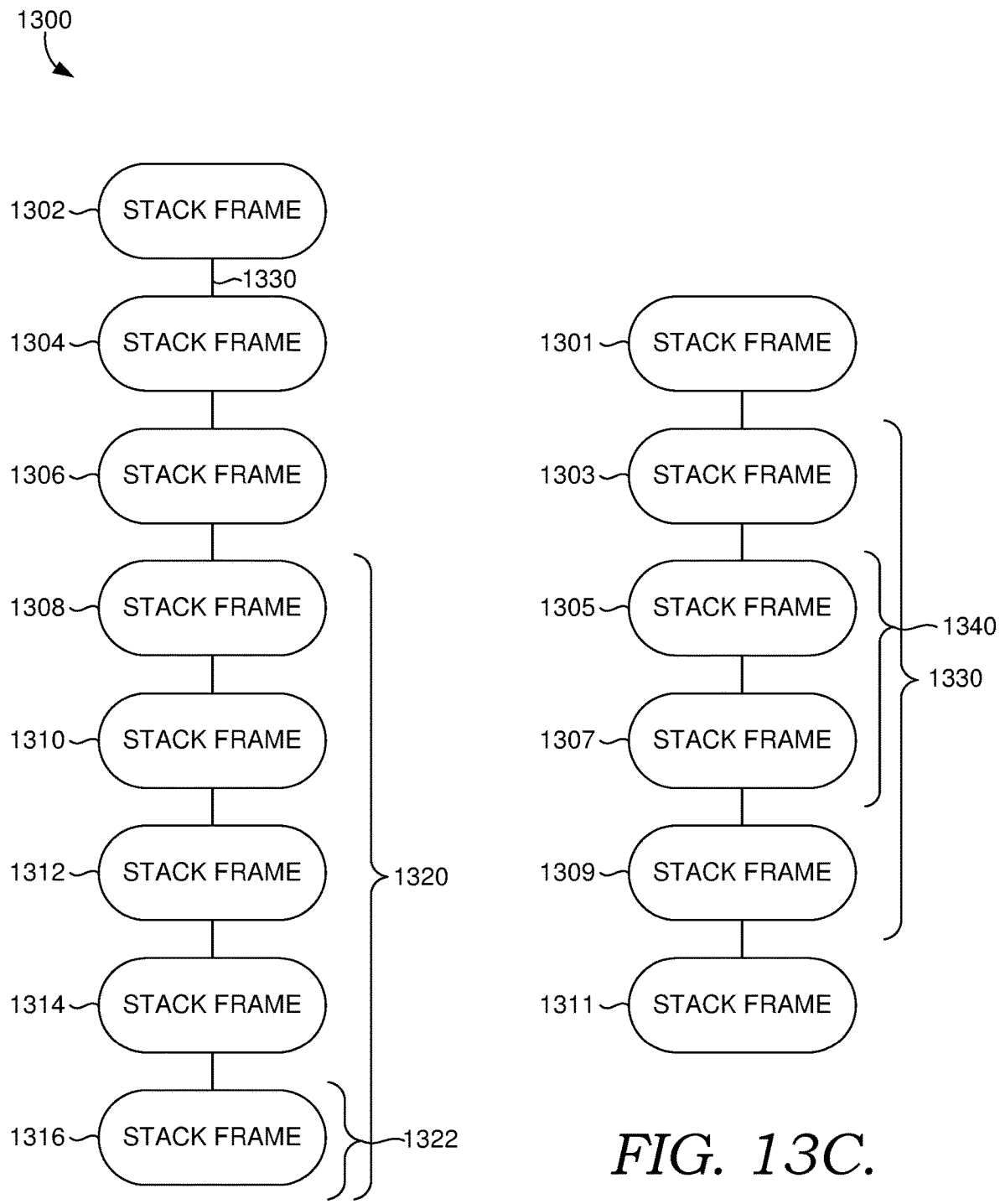
FIG. 13B is a schematic diagram illustrating how unique identifiers are generated for one or more performance issues or call stack frames, in accordance with some embodiments.
FIG. 13C is a schematic diagram illustrating how unique identifiers are generated for one or more performance issues or call stack frames, in accordance with some embodiments.

FIG. 13B is a schematic diagram illustrating how unique identifiers are generated for one or more performance issues or call stack frames, according to embodiments. FIG. 3B includes a call stack 1300 that is broken up into stack frames 1302, 1304, 1306, 1308, 1310, 1312, 1314, and 1316. In some embodiments, the call stack 1300 represents a graph data structure (e.g., a directed acyclic graph) where each node (e.g., 1302) represents a call stack frame and each edge (e.g., 1330) represents the proportion of the particular performance issue detected between each of the connecting nodes. For example, for the registry functionality, the edges are the sample counts (read/write counts), and in the file functionality, the edges can be byte counts. The bracket indicator 1320 indicates that the nodes or stack frames 1308, 1310, 1312, 1314, and 1316 are all associated with a performance issue. For example, it can be determined that each of these nodes had a hang time greater than a 0 MS threshold or were otherwise active. In another example, each of these nodes can be associated with a thread count above a 0 count threshold or some other performance policy threshold (e.g., 20 count). In some embodiments, bracket indicator 1320 represents a "total time" time threshold (e.g., in milliseconds) for a range of stack frames for a given thread, as indicated in FIG. 8A and FIG. 8B.

In some embodiments, it can then be determined that between a set of parent and child stack frames within group 1320, whether the proportion of a performance issue (e.g., hang time, byte count, etc.) meets a particular threshold. For example, referring back to FIG. 13A, this can be determined by computing the quantity of blame frames (B) where parent and child frame differ in cost>=to cost E (e.g., a threshold proportion of: hang time, CPU time, total time, sample count, etc.). In another example it can be determined which nodes within the group 1320 have a proportion of thread counts over a threshold. In some embodiments, this represents a "wait time" time threshold (e.g., in milliseconds) for a range of stack frames for a given thread, as indicated in FIG. 8A and FIG. 8B.

FIG. 13B illustrates that only one stack frame or node 1316 (i.e., the leaf node) within the group 1320 meets the particular threshold. In some embodiments, when the leaf node is responsible for a performance issue over a threshold and it is the only stack frame that is associated with a performance issue over the performance threshold, then a unique identifier is generated for the entire call stack 1300, which consolidates or reduces the entire call stack 1300 to a single identifier representing a single performance issue. In this way, each call stack frame of the call stack 1300 is reduced to a single identifier for bug generation or reporting (e.g., as illustrated in FIG. 12D). For example, referring back to FIG. 13A, because B is equal to 1, the entire call stack is assigned blame. It is understood that although the node 1316 is the bottom-most stack frame in the call stack 1300, a "leaf" node need not necessarily be the last node in the call stack 1300 (nor does the parent node need to be node 1302). Rather, each node can take on a parent or leaf role depending on the range of stack frames detected that are associated with a particular proportion threshold of a performance issue. For example, the group 320 may at one time include the nodes 308 through 314 (and not 316). Accordingly, in this situation, the parent node is node 1308 and the child node is node 1316.

FIG. 13C is a schematic diagram illustrating how unique identifiers are generated for one or more performance issues or call stack frames, according to embodiments. FIG. 13C includes a call stack 1300-1 that is broken up into stack frames 1301, 1303, 1305, 1307, 1309, and 1311. In some embodiments, the call stack 1300-1 represents a graph data structure where each node (e.g., 1301) represents a call stack frame and each edge represents the proportion of the particular performance issue detected between each of the connecting nodes. The bracket indicator 1330 indicates that the nodes or stack frames 1303, 1305, 1307, and 1309 are all associated with a performance issue. For example, it can be determined that each of these nodes had a hang time over a performance issue threshold (e.g., >200 MS). In some embodiments, it can then be determined that between a set of parent and child stack frames within group 1330, whether the proportion of a performance issue (e.g., hang time, byte count, etc.) meets a particular threshold. For example, referring back to FIG. 13A, this can be determined by computing the quantity of blame frames (B) where parent and child frame differ in cost>=to cost E (e.g., a threshold proportion of hang time). Accordingly, for example, it can be determined that the parent stack frame 1305 and child stack frame 1307 are the only parent-child pair that are greater than or equal the cost E (e.g., share greater than 50% of the total hang time), which is indicated by the sub-group 1340. Accordingly, only the sub-group 1340 in some embodiments take on the same unique identifier for bug generation. Put another way, none of the other stack frames 1301, 1303, 1309, and 1311 take on the same unique identifier, but each have their own unique identifier associated with a bug. For example, referring back to step 2 of FIG. 13A, if B is greater than 1, the CRC is computed for the unique symbol names in B. In some embodiments, the sub-group 1340 represents call stack frames that are over a "wait time" threshold as illustrated in FIGS. 8A and 8B.

Figure 14:
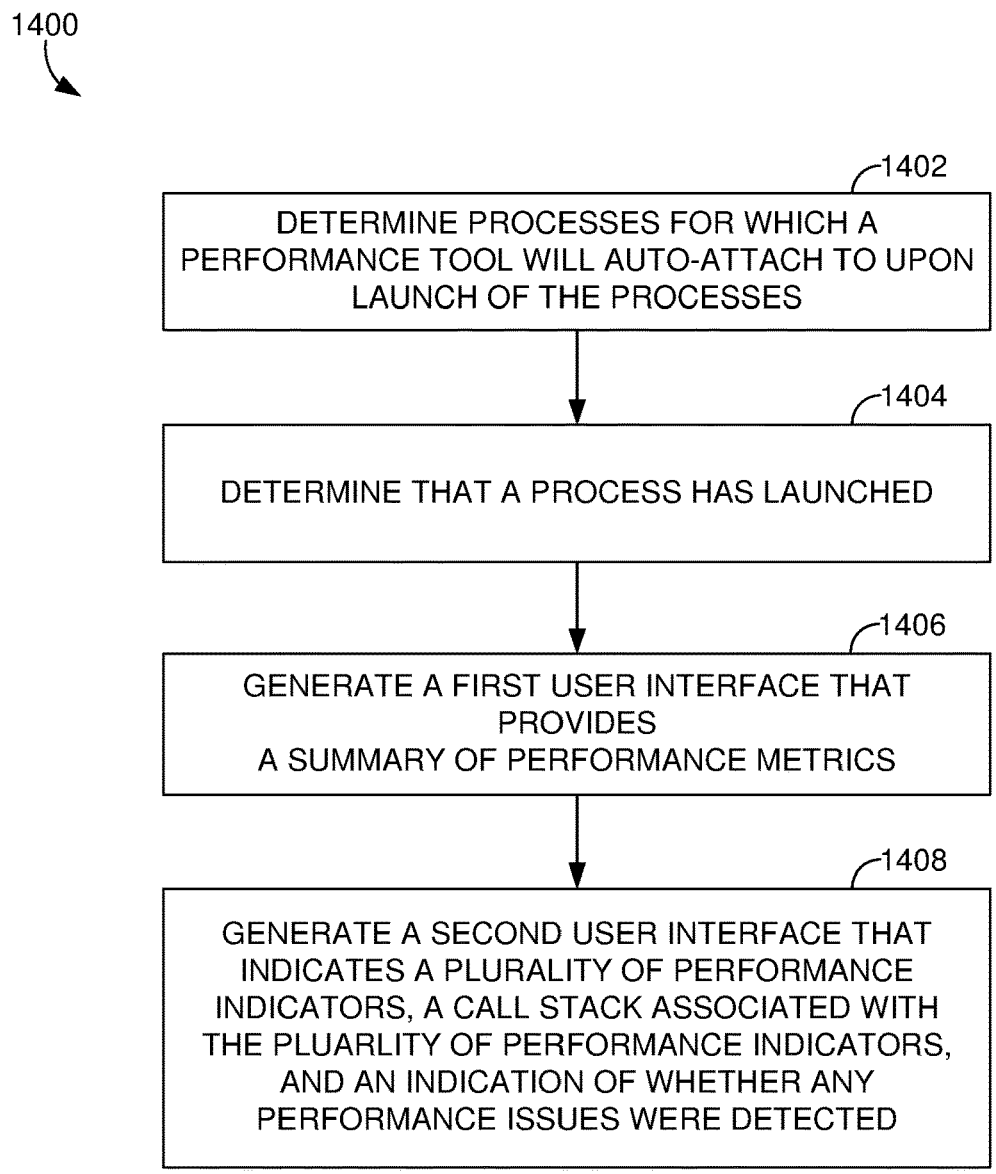
FIG. 14 is a flow diagram of an example process for providing multiple performance tool user interfaces, in accordance with some embodiments.

FIG. 14 is a flow diagram of an example process 1400 for providing multiple performance tool user interfaces, according to some embodiments. The process 1400 (and/or any of the functionality described herein (e.g., process 1500, 1600)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer program product as described herein may perform or be caused to perform the processes 1400, 1500, 1600, and/or any other functionality described herein.

Per block 1402, one or more processes for which a performance tool will attach to upon the process launch is determined. In this way, a currently running process may be one process of a plurality of processes defined in a field. In some embodiments, the defining in the field is indicative of requesting a performance tool to automatically analyze performance of the plurality of processes in response to the plurality of processes being launched. For example, referring back to FIG. 3, a user inputs three processes in the field 313 of the hydra element 30 so that, in hydra mode, the performance tool can watch when those processes are launched and, upon launch, automatically attach to the processes.

Per block 1404, it can be determined (e.g., by the indicator UI component 206) that a process has launched. For example, an operating system may receive a request from a user to open or start an application via a GUI selection of an application or command line request. Responsively, the operating system may be configured to automatically communicate with or cause a performance tool the request at which point the performance tool performs block 1404. Per block 1406, a first user interface that provides a summary of performance metrics is generated (e.g., by the indicator UI component 206). In some embodiments, block 1406 occurs automatically and in response to block 1404. For example, the windows 403 and/or 403-1 can automatically be provided over the application 401 as indicated in FIGS. 4A and 4B. Alternatively, in some embodiments, there is no user interface provided. Rather, the performance tool can hide in the background and automatically analyze performance of the process in response to detecting that a process has launched per block 1404.

Per block 1408, a second user interface that indicates: a plurality of performance indicators, one or more call stacks associated with the plurality of performance indicators, and an indication of whether any performance issues were detected is generated (e.g., by the full view UI component 212). In some embodiments, in response to a selection of an element within the first user interface, the second user interface is caused to be displayed. The second user interface may provide more detailed performance metrics relative to the first user interface. For example, referring back to FIGS. 4 and 5, in response to the user selecting any portion of the window 403-1, the screenshot 500 can automatically be provided, which gives a more detailed view and data relative to the window 403-1. In some embodiments, the generating of the first or second user interface causes or improves the way a computer processes an application because the performance issues can be remedied, which means that a computer can efficiently process the application. For example, if a hang performance issue is reported, the hang time can be reduced, thereby allowing a CPU to execute instructions more proficiently.

In some embodiments, additional user interfaces or screenshots can be provided after block 1408. In various embodiments, this occurs in response to the user further selecting different elements or tabs within the second user interface. For example, in response to the user selecting any of the performance tabs in the element 503 of FIG. 5, or any other element in FIG. 5, the screenshots corresponding to FIGS. 6 through 13 may be displayed.

Figure 15:
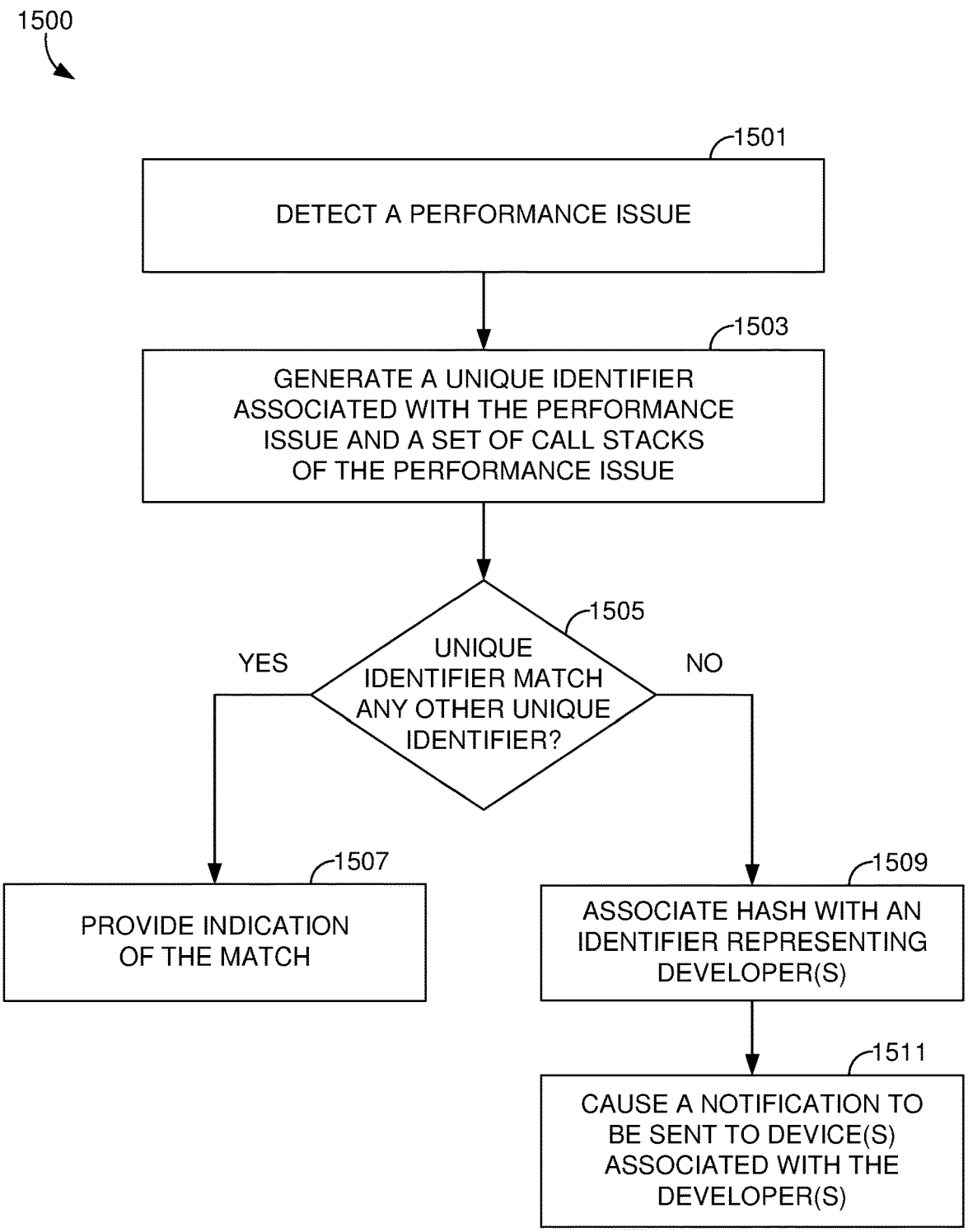
FIG. 15 is a flow diagram of an example process for providing notifications or notifications based on whether a unique identifier matches another unique identifier, in accordance with some embodiments.

FIG. 15 is a flow diagram of an example process 1500 for providing notifications or notifications based on whether a unique identifier matches another unique identifier, according to some embodiments. Per block 1501, a performance issues is detected (e.g., for a currently running process), such as by the hangs component 214. For example, there may be a unit of code that defines a function called "ramp" that multiplies or doubles a value of the variable n (e.g., def ramp(n): n=n*2/return n). Underneath the function a variable may be defined called X and assigning it a value (e.g., X=100). Underneath this variable definition, the ramp function is called as an output (e.g., print(ramp(x)). The first or bottom layer stack frame may store the variable and its value, X=100 and line number, such as 9. Line 9 may be where something needs printed or outputted (i.e., "print (ramp(s))") but first the "ramp" function must be run. Accordingly, this function calls the "ramp" function and sends it the variable value of 100. Because this function is active or is calling another function without returning values, the first call stack frame is generated or otherwise stored in the call stack. Each stack frame may represent each active function.

The "ramp" function (e.g., on line 3) then takes the parameter value of 100 passed from line 9, store the value 100 locally as a variable called "n," and generates a second stack frame on top of the first stack frame indicating this information. And, after the value 100 is doubled (i.e., to make 200) according to the "ramp" function, the value of 200 is then returned back to the function (i.e., "print(ramp (x)") that called the "ramp" function. In some embodiments, once the value is returned to the print function, the second stack frame is popped or removed indicating that the second function is no longer active or running. While the second call stack frame is still active (i.e., it has not been popped off at this point), the performance tool can indicate that there was a hang policy issue for both call stack frames—one hang when the "print(ramp(x))" function called the "ramp" function and another hang when the "ramp" function is executing.

Per block 1503, a unique identifier associated with both the performance issue and a set of call stacks is generated (e.g., by the hashing component 222-1). Using the illustration above, for example, both of the stack frames can be represented together as a single hash value and "hang" performance issue. In some embodiments, the unique identifier can be or represent a hash (e.g., CRC) as illustrated in FIGS. 13A, 13B, and 13C. In another example, the unique identifier can correspond to the identifier in FIG. 12C indicating that the bug has been logged.

Per block 1505, it is determined (e.g., by the attribution component 222-3) whether the unique identifier matches any other unique identifier. This is indicative of whether a bug associated with the performance issue has or has not been logged by a user or it is indicative of another instance of the performance issue having been previously logged. For example, in response to a user selecting the UI indicator 403 or 403-1 but before display of the screenshot 500 of FIG. 5, a performance issue can be determined and marked with a hash and a determination can be made whether the hash matches any other hash in a bug data base so that the "create" or "new" indicia can responsively be displayed to the screenshot 500. Another "instance" of the performance issue may be another time at which the same performance issue is detected.

Per block 1506, if there is no match of unique identifiers, an indication of the mismatch is provided (e.g., by the attribution component 222-3). For example, referring back to FIG. 12A, the "create" indicia is displayed under the "bug" attribute of the screenshot 1200. In some embodiments, for each performance issue detected a hash is generated. This hash can be generated based on a combination of properties, such as the process being analyzed, the call stack, the module name and the like. In some embodiments, when a bug is generated, the hash is uploaded to a hidden field and users, such as administrators, can remove or disassociate the hash with a particular performance issue. In this way, if the same performance issue is detected that would have matched the hash indicating that the same performance issue was detected, the performance tool will treat it as a new performance issue.

Per block 1509, the hash is associated (e.g., by the e.g., by the attribution component 222-3) with an identifier representing one or more developers. For example, after it is determined that a hash value does not match any other hash value (indicative of a bug associated with the performance issued not having been logged by a user) the hash value can be associated, via a data structure (e.g., a hash map), with an identifier indicative of a developer or team of developers that developed a code portion associated with the performance issue. In some embodiments, such association can be made via the policy file component 202 or FIG. 11 where the user configures a policy file indicating the server or path the bug or performance issue should be routed to.

Per block 1511, a notification is caused to be sent to one or more devices associated with the developers. For example, based on the hash value not matching any other hash value per block 1505 and the associating per block 1509, a notification of the performance issue is caused to be sent (e.g., by the attribution component 222-3).

Per block 1507, if the unique identifier matches any other unique identifier stored in memory, an indication of the match is provided. Based on the determining that the identifier matches another identifier stored in memory, an indication may be provided, to a user computing device, that another instance of the performance issue has been previously logged. For example, based on the hash value matching a second hash value in a database, a user interface identifier indicating that a bug associated with the performance issue has already been reported by a user is provided. The indication may also provide that the performance issue has already been logged by another user. For example, referring back to FIG. 12D, the indication may include the "14789 (New)", indicating that the bug has already been hashed.

Figure 16:
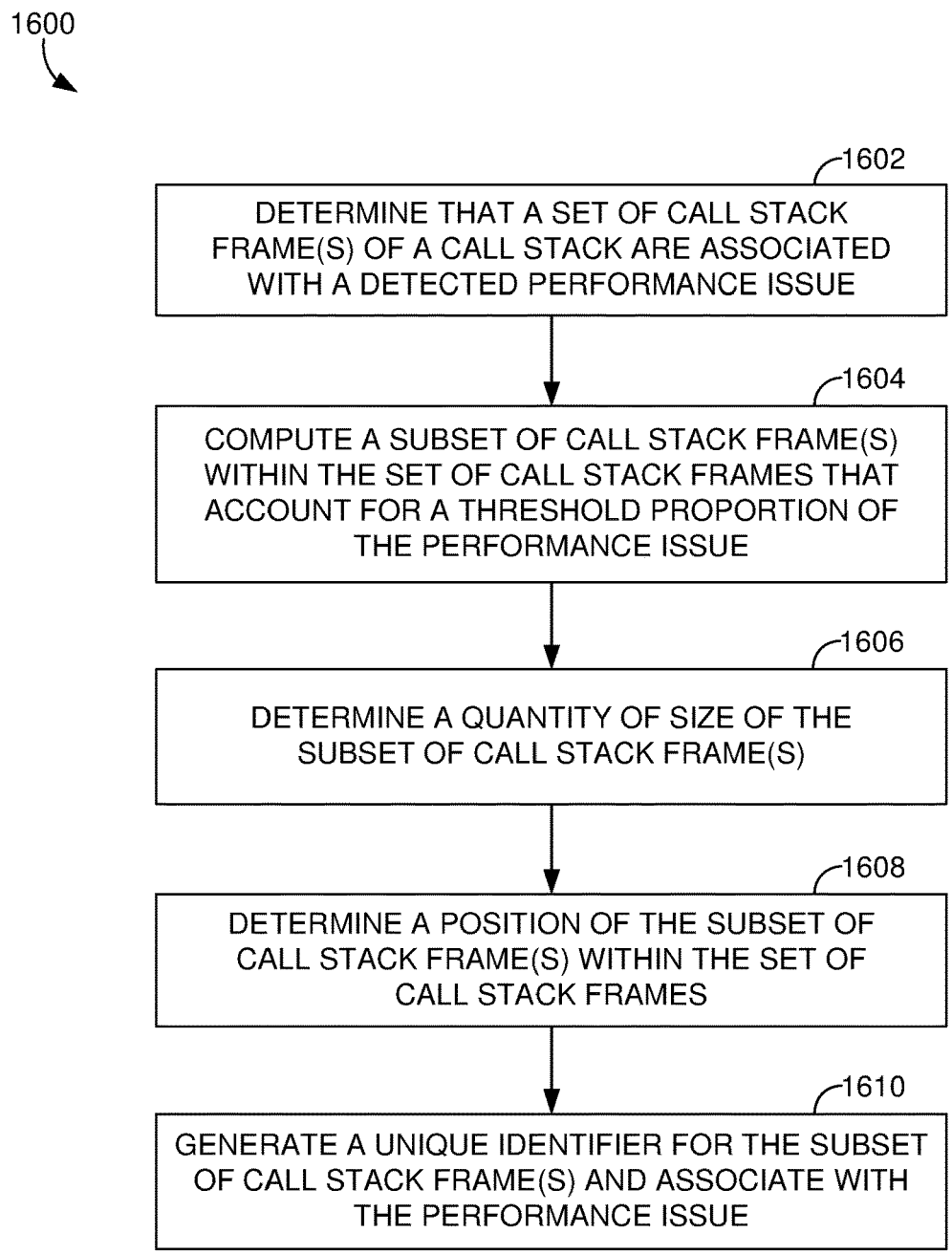
FIG. 16 is a flow diagram of an example process for generating a unique identifier for a subset of call stack frames and a performance issue, in accordance with some embodiments.
Figure 17:
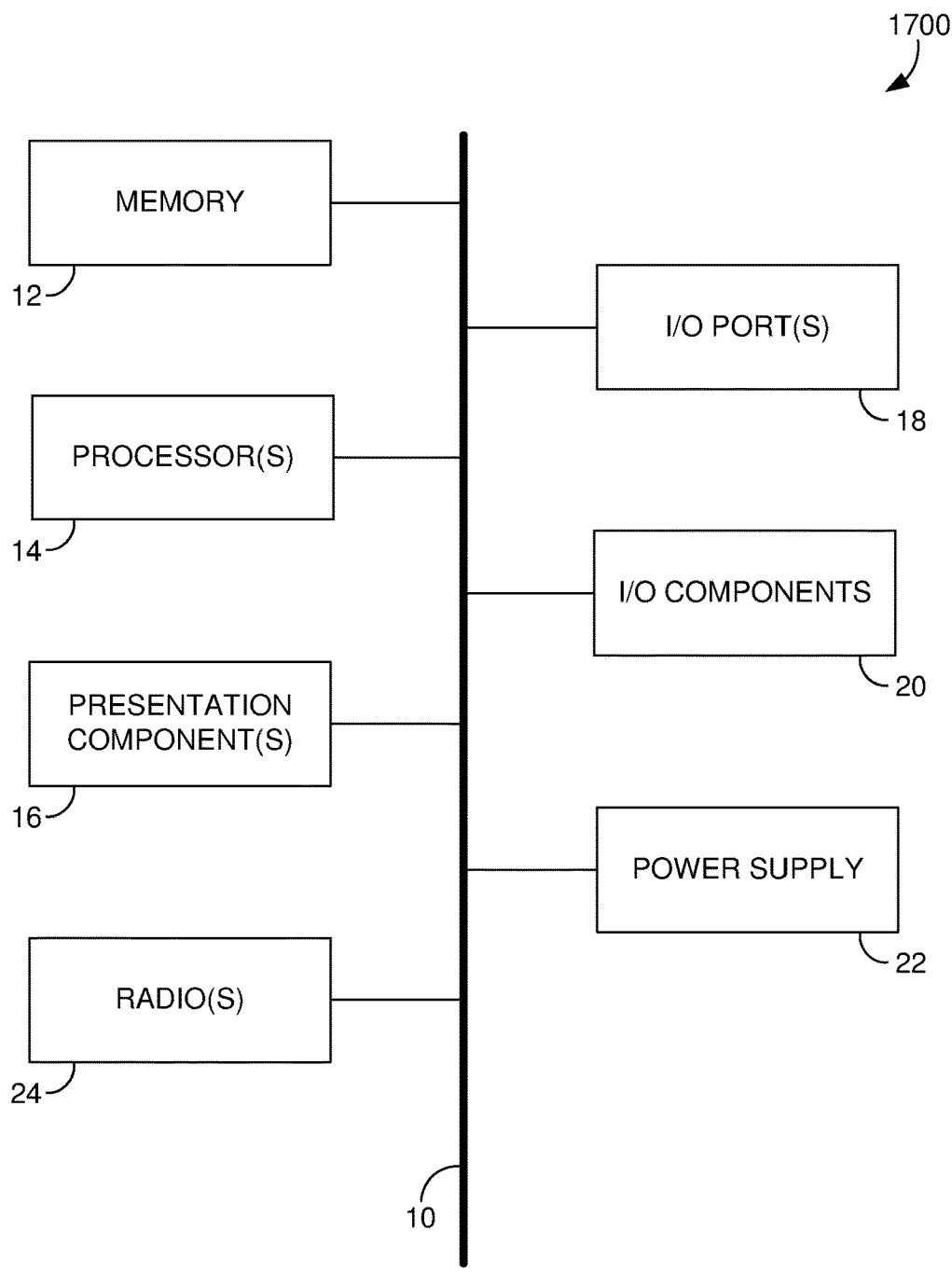
FIG. 17 is a block diagram of a computing device, in accordance with some embodiments.

FIG. 16 is a flow diagram of an example process 1600 for generating a unique identifier for a subset of call stack frames and a performance issue, according to some embodiments. In some embodiments, the process 1600 represents block 1503 of FIG. 5 where a unique identifier is generated. Per block 1602, it is determined (e.g., by the insights component 222) that a set of call stack frames of a call stack are associated with a detected performance issue. For example, it can be determined for a thread or set of threads, which call stacks contain a performance reading over a first threshold. For example, referring back to FIG. 8B, it can be determined that a set of hang call stack frames have surpassed a "total time" threshold. In another example, for thread count, it can be determined that there are a threshold quantity of thread counts for a module. In yet another example, the set of call stack frames can correspond to the group 1320 or 1330 of FIGS. 13B and 13C. In some embodiments, the set of stack frames of block 1602 are color-coded (light shade) or otherwise highlighted in a user interface, as indicated in FIGS. 8A and 8B.

Per block 1604, a subset of call stack frames within the set of call stack frames are computed (e.g., by the hashing component 222-1) where the subset of call stack frames account for a threshold proportion of the performance issue.

In some embodiments, this includes determining the quantity (e.g., 1 or more) of call stack frames within the particular location that account for a threshold proportion of performance, which includes determining that a parent call stack frame and a child call stack frame account for a threshold percentage or proportion of hang time of a hang performance issue. For example, this is illustrated in FIG. 13A. In yet another example, using the illustration above, the second stack frame associated with the "ramp" function can account for over a threshold percentage of the hang time. In some embodiments, the subset of call stack frames in block 1604 correspond with a threshold hang time within the "wait time" category of FIGS. 8A and/or 8B or represent the groups 1322 or 1340 of FIGS. 13A and 13B. In some embodiments, the subset of call stack frames of block 1604 are color-coded (e.g., a dark shade) in a user interface or otherwise marked, as indicated in FIGS. 8A and 8B. In some embodiments, a distinction is made between the call stack frames of block 1602 and the subset of call stack frames of block 1604. For example, in a user interface, the call stack frames can be highlighted in a light shade of color, whereas the subset of call stack frames are highlighted in a darker shade color relative to the call stack frames. This can be indicative of where the largest proportion of performance issues are occurring for active threads.

Per block 1606, a quantity or size of the subset of call stack frames can be determined (e.g., by the hashing component 222-2). For example, referring back to FIGS. 13A, 13B, and 13C, it can be determined if the quantity or size is equal to 1 or greater than 1. Per block 1608, a position of the subset of call stack frames within the set of call stack frames can be determined (e.g., by the hashing component 222-1). Thus a position of the subset of call stack frames within the set of call stack frames that account for the threshold proportion of the performance issue are determined. In various embodiments, the determining is indicative of determining whether the subset is a leaf call stack frame, a leaf node, or other data structure indicating that the subset of call stack frames are at the bottom of the call stack or whether the subset corresponds to branch nodes or leaf nodes (e.g., in a graph data structure) or are otherwise not the last position in the call stack.

Per block 610, a unique identifier is generated for the subset of stack frames and associated with the performance issue. In some embodiments, the unique identifier also uniquely identifies the performance issue based at least in part on the particular location and the quantity of call stack frames within a particular location that account for the threshold proportion of the performance issue. In some embodiments, the unique identifier for the subset of stack frames is generated based on the quantity or size of the subset of call stack frames and the position of the subset of call stack frames. In some embodiments, based at least in part on determining that the particular set of call stack units are associated with a detected hang and the determining that the parent call stack unit and the child call stack unit account for the threshold proportion of hang time of the performance issue, the unique identifier (e.g., a hash) is generated. For example, referring back to FIGS. 13A, 13B, and 13C, the hash is generated for the particular performance issue and the subset of call stack frames that meet the requirements indicated above.

In some embodiments, the generating of the hash value or unique identifier is further based on determining whether the quantity of stack frames within a particular location is equal to 1 and is the last stack frame in the quantity of stack frames, such as illustrated in FIG. 13A, for example. In some embodiments, in response to the generating of the unique identifier. An indicator that identifies the subset of call stack frames is provided for display on a user interface. For example, the color-coded indicia in FIG. 8A or the "14789 (New)" indicia of FIG. 12D.

In various embodiments, the unique identifier uniquely identifies the subset of call stack frames based at least in part on the position of the subset of call stack frames not being at a leaf call stack frame. And another subset of call stack frames of the call stack are not uniquely identified by the unique identifier. For example, referring back to FIG. 13C, the call stack frames 1305 and 1307 (the group 1340) are not a leaf position (e.g., at the positions of 1311 (or 1309)), and thus take on the same unique identifier. However, the other call stack frames 1301, 1303, 1309, and 11311 are not identified by the same unique identifier, but, for example, are each individually identified. In some embodiments, the unique identifier further uniquely identifies an entirety of a call stack based at least in part on the quantity (block 1606) being equal to 1. For example, referring back to FIG. 13B, if the quantity of blame or performance issue is allocated to stack frame 1316 only. Accordingly, the entire call stack 1300 takes on the entire blame or has the same unique identifier.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

With reference to FIG. 8, computing device 800 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 800 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 800 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 24 (or similar wireless communication components). The radio 24 transmits and receives radio or wireless communications. The computing device 800 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, and the like.) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A computer-implemented method comprising: detecting a performance issue for a currently running process; determining, within a call stack of the process, a location of the performance issue; determining, within the location, a quantity of call stack frames that account for a threshold proportion of the performance issue; based at least in part on the location and the quantity, generating an identifier that uniquely identifies the performance issue; determining that the identifier matches another identifier stored in memory, the matching is indicative of another instance of the performance issue having been previously logged; and based on the determining that the identifier matches another identifier stored in memory, providing an indication, to a user computing device, that another instance of the performance issue has been previously logged.

Clause 2. The method of clause 1, further comprising: determining that the identifier does not match the any other identifier, wherein a bug associated with the performance issue has not been logged by a user; and associating, via a data structure, the identifier with an identifier indicative of a developer or team of developers that developed a code portion associated with the performance issue.

Clause 3. The method of clause 2, further comprising, based on the identifier not matching the any other identifier and the associating, causing a notification of the performance issue to be sent to a device associated with the developer or group of developers.

Clause 4. The method of clause 1, wherein the currently running process is one process of a plurality of processes defined in a field, and wherein the defining in the field is indicative of requesting a performance tool to automatically analyze performance of the plurality of processes in response to the plurality of processes being launched.

Clause 5. The method of clause 1, further comprising based on the identifier matching a second identifier in a database, providing a user interface an identifier indicating that a bug associated with the performance issue has already been reported by a user.

Clause 6. The method of clause 1, wherein the determining, within the location, of the quantity of call stack frames that account for the threshold proportion of the performance includes determining that a parent stack frame and a child stack frame are responsible for a threshold percentage of hang time of an overall hang time of a hang performance issue.

Clause 7. The method of clause 1, wherein the generating of the identifier that uniquely identifies the performance issue is further based on determining whether the quantity of stack frames within the particular location is equal to 1 and is the last stack frame in the quantity of stack frames.

Clause 8. One or more computer storage media having computer-executable instructions embodied thereon that, when executed, by one or more processors, cause the one or more processors to perform a method, the method comprising: determining that a particular set of call stack frames of a call stack are associated with a detected performance issue; computing a subset of call stack frames within the set of call stack frames that account for a threshold proportion of the performance issue; determining a quantity or size of the subset of call stack frames within the set of call stack frames that account for the threshold proportion of the performance issue; determining a position of the subset of call stack frames within the set of call stack frames that account for the threshold proportion of the performance issue; and generating an identifier that uniquely identifies the performance issue based on the quantity or size of the subset of call stack frames and the position of the subset of call stack frames.

Clause 9. The computer storage media of clause 8, wherein the method further comprises in response to the generating, providing, for display on a user interface of a user device, an indicator that identifies the subset of call stack frames.

Clause 10. The computer storage media of clause 8, wherein the unique identifier further uniquely identifies an entirety of the call stack based at least in part on the quantity being equal to 1.

Clause 11. The computer storage media of clause 8, wherein the identifier further uniquely identifies the subset of call stack frames based at least in part on the position of the subset of call stack frames not being at a leaf call stack frame, and wherein another subset of call stack frames of the call stack are not uniquely identified by the identifier.

Clause 12. The computer storage media of clause 8, the method further comprising: determining that the identifier matches another other identifier, wherein a bug associated with the performance issue has been logged by a user; and based on the identifier matching the other identifier, causing a user interface to display the identifier and an indication that the performance issue has been logged by another user.

Clause 13. The computer storage media of clause 8, wherein the detected performance issue occur for a currently running process, and wherein the currently running process is one process of a plurality of processes defined in a field, and wherein the defining in the field is indicative of requesting a performance tool to automatically analyze performance of the plurality of processes in response to the plurality of processes being launched.

Clause 14. The computer storage media of clause 8, causing, prior to the determining that the particular set of call stack frames of the call stack are associated with a detected performance issue, a first user interface to be displayed, the first user interface indicating a summary of performance metrics, and in response to a selection of an element within the first user interface, causing a second user interface to be displayed that provides more detailed performance metrics relative to the first user interface.

Clause 15. A system for implementing classification-based adjustable seek energy settings in storage device systems, the system comprising: one or more processors; and one or more computer storage media storing computer-useable instructions that, when used by the one or more processors, cause the one or more processors to perform a method, the method comprising: determining that a particular set of call stack units of a call stack are associated with a detected hang performance issue; determining a parent call stack unit and a child call stack unit within the particular set of call stack units account for a threshold proportion of hang time of the hang performance issue; and based at least in part on the determining that the particular set of call stack units are associated with the detected hang and the determining the parent call stack unit and the child call stack unit account for the threshold proportion of hang time of the performance issue, generating a hash that uniquely identifies the performance issue.

Clause 16. The system of clause 15, the method further comprising determining whether the child call stack unit corresponds to a leaf node of a data structure.

Clause 17. The system of clause 16, wherein the generating of the hash is further based on determining whether the child call stack unit corresponds to the leaf node of the data structure.

Clause 18. The system of clause 15, wherein the method further comprises: determining that the hash does not match the any other hash value, wherein a bug associated with the performance issue has not been logged by a user; and associating, via a data structure, the hash value with an identifier indicative of a developer or team of developers that developed a code portion associated with the performance issue.

Clause 19. The system of clause 18, the method further comprising based on the hash value not matching the any other hash value and the associating, causing a notification of the performance issue to be sent to a device associated with the developer or group of developers.

Clause 20. The system of clause 15, wherein the hash also uniquely identifies the parent call stack unit and the child call stack unit.

The invention claimed is:

1. A computer-implemented method comprising:
detecting a performance issue for a currently running process;
determining, within a call stack of the process, a quantity of call stack frames that account for a threshold proportion of the performance issue;
determining a location of the call stack frames within the call stack of the process that account for the threshold proportion of the performance issue;
based at least in part on the location and the quantity, determining whether to use a unique identifier or multiple identifiers to identify the performance issue;
responsive to determining to use the unique identifier, generating the identifier that uniquely identifies the performance issue, wherein the generating of the identifier that uniquely identifies the performance issue is further based on determining whether the quantity of stack frames within a particular location is equal to one and one stack frame within the particular location is a last stack frame in the quantity of stack frames;
determining whether the identifier is associated with another identifier stored in memory; and
based on the determining that the identifier is associated with the another identifier stored in the memory, providing an indication, to a user computing device, that another instance of the performance issue has been previously logged.

2. The method of claim 1, further comprising:
determining that the identifier is not associated with other identifiers stored in the memory, wherein a bug associated with the performance issue has not been logged by a user; and
associating, via a data structure, the identifier with a second identifier indicative of a developer or team of developers that developed a code portion associated with the performance issue.

3. The method of claim 2, further comprising, based on the identifier being not associated with the other identifiers stored in the memory and the associating, causing a notification of the performance issue to be sent to a device associated with the developer or team of developers.

4. The method of claim 1, wherein the currently running process is one process of a plurality of processes defined in a field, and defining the plurality of processes in the field is indicative of requesting a performance tool to automatically analyze performance of the plurality of processes in response to the plurality of processes being launched.

5. The method of claim 1, further comprising based on the identifier being associated with a second identifier in a database, providing a user interface the second identifier indicating that a bug associated with the performance issue has already been reported by a user.

6. The method of claim 1, wherein the determining the quantity of call stack frames that account for the threshold proportion of the performance includes determining that a parent stack frame and a child stack frame are responsible for a threshold percentage of hang time of an overall hang time of a hang performance issue.

7. One or more computer storage media having computer-executable instructions embodied thereon that, when executed, by one or more processors, cause the one or more processors to perform operations comprising:
determining that a particular set of call stack frames of a call stack are associated with a detected performance issue;
computing a subset of call stack frames within the set of call stack frames that account for a threshold proportion of the performance issue;
determining a quantity or size of the subset of call stack frames within the set of call stack frames that account for the threshold proportion of the performance issue;
determining a position of the subset of call stack frames within the set of call stack frames that account for the threshold proportion of the performance issue;
based at least in part on the position and the quantity or size of the subset, determining whether to use a unique identifier or multiple identifiers to identify the performance issue; and
responsive to determining to use the unique identifier, generating the identifier that uniquely identifies the performance issue based on the quantity or size of the subset of call stack frames and the position of the subset of call stack frames, wherein the generating of the identifier that uniquely identifies the performance issue is further based on determining whether the quantity of stack frames within a particular location is equal to one and one stack frame within the particular location is a last stack frame in the quantity of stack frames.

8. The computer storage media of claim 7, wherein the computer-executable instructions that, when executed, cause the one or more processors to further perform an operation comprising in response to the generating, providing, for display on a user interface of a user device, an indicator that identifies the subset of call stack frames.

9. The computer storage media of claim 7, wherein the identifier further uniquely identities an entirety of the call stack based at least in part on the quantity being equal to one.

10. The computer storage media, of claim 7, wherein the identifier further uniquely identifies the subset of call stack frames based at least in part on the position of the subset of call stack frames not being at a leaf call stack frame, and another subset of call stack frames of the call stack is not uniquely identified by the identifier.

11. The computer storage media of claim 7, wherein the computer-executable instructions that, when executed, cause the one or more processors to further perform the operations comprising:
   determining that the identifier is associated with another identifier, wherein a bug associated with the performance issue has been logged by a user; and
   based on determining that the identifier is associated with the another identifier, causing a user interface to display the identifier and an indication that the performance issue has been logged by the user.

12. The computer storage media of claim 7, wherein:
   the detected performance issue occurs for a currently running process,
   the currently running process is one process of a plurality of processes defined in a field, and
   defining the plurality of processes in the field is indicative of requesting a performance tool to automatically analyze performance of the plurality of processes in response to the plurality of processes being launched.

13. The computer storage media of claim 7, wherein, prior to the determining that the particular set of call stack frames of the call stack are associated with the detected performance issue, the computer-executable instructions that, when executed, cause the one or more processors to further perform the operations comprising:
   causing a first user interface to be displayed, the first user interface indicating a summary of performance metrics; and
   in response to a selection of an element within the first user interface, causing a second user interface to be displayed that provides more detailed performance metrics relative to the first user interface.

14. A system comprising:
   one or more processors; and
   one or more computer storage media storing computer-useable instructions that, when used by the one or more processors, cause the one or more processors to perform operations comprising:
   determining that a particular set of call stack units of a call stack are associated with a detected hang performance issue;
   determining a parent call stack unit and a child call stack unit within the particular set of call stack units account for a threshold proportion of hang time of the hang performance issue;
   determining a location of the child call stack unit within a data structure; based at least in part on the location of the child call stack, determining whether to use a unique identifier or multiple identifiers to identify the hang performance issue; and
   based at least in part on the determining the parent call stack unit and the child call stack unit account for the threshold proportion of hang time of the performance issue and the determined location of the child call stack unit within the data structure, and responsive to determining to use the unique identifier, generating a hash that uniquely identifies the performance issue, wherein the generating of the hash that uniquely identifies the performance issue is further based on determining whether the quantity of child call stack units within a particular location is equal to one and one child call stack unit within the particular location is a last child call stack unit in the quantity of child call stack units.

15. The system of claim 14, wherein, to determining the location of the child call stack unit within the data structure, the computer-useable instructions that, when used by the one or more processors, cause the one or more processors to further perform an operation comprising determining whether the child call stack unit corresponds to a leaf node of the data structure.

16. The system of claim 15, wherein the generating of the hash is further based on determining whether the child call stack unit corresponds to the leaf node of the data structure.

17. The system of claim 14, wherein the computer-useable instructions that, when used by the one or more processors, cause the one or more processors to further perform operations comprising:
   determining that the hash is not associated with other hash varies, wherein a bug associated with the performance issue has not been logged by a user; and
   associating, via a data structure, the hash with an identifier indicative of a developer or team of developers that developed a code portion associated with the performance issue.

18. The system of claim 17, wherein the computer-useable instructions that, when used by the one or more processors, cause the one or more processors to further perform an operation comprising based on the hash being not associated with the other hash values and the associating, causing a notification, of the performance issue to be sent to a device associated with the developer or team of developers.

19. The system of claim 14, wherein the hash also uniquely identifies the parent call stack unit and the child call stack unit.

* * * * *